US012677328B2

(12) United States Patent
Kedalagudde et al.

(10) Patent No.: US 12,677,328 B2
(45) Date of Patent: Jul. 7, 2026

(54) POLICY ENHANCEMENT TO SUPPORT GROUP APPLICATION FUNCTION (AF) SESSION FROM ARTIFICIAL INTELLIGENCE/MACHINE LEARNING (AIML) PROVIDER AF WITH REQUIRED QUALITY OF SERVICE (QOS)

(71) Applicant: Intel Corporation, Santa Clara, CA (US)

(72) Inventors: Meghashree Dattatri Kedalagudde, Portland, OR (US); Alexandre Saso Stojanovski, Paris (FR); Changhong Shan, Shanghai (CN); Abhijeet Kolekar, Portland, OR (US); Puneet Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/168,342

(22) Filed: Feb. 13, 2023

(65) Prior Publication Data

US 2023/0199868 A1 Jun. 22, 2023

Related U.S. Application Data

(60) Provisional application No. 63/318,265, filed on Mar. 9, 2022, provisional application No. 63/311,203, filed on Feb. 17, 2022.

(51) Int. Cl.
*H04W 4/00* (2018.01)
*H04W 24/02* (2009.01)
*H04W 76/10* (2018.01)
*H04W 80/10* (2009.01)

(52) U.S. Cl.
CPC ........... *H04W 76/10* (2018.02); *H04W 24/02* (2013.01); *H04W 80/10* (2013.01)

(58) Field of Classification Search
None
See application file for complete search history.

(56) References Cited

FOREIGN PATENT DOCUMENTS

WO WO-2022238439 A1 * 11/2022 ......... H04L 65/1063
WO WO-2023141167 A1 * 7/2023 ........ H04W 28/0268

OTHER PUBLICATIONS

3GPP, "Technical Specification Group Services and System Aspects; Study on traffic characteristics and performance requirements for AI/ML model transfer in 5GS (Release 18)," 3GPP TR 22.874 V18.2.0 (Dec. 2021), 5G, 111 pages.
3GPP, "Technical Specification Group Services and System Aspects; Policy and charging control architecture (Release 17)," 3GPP TS 23.203 V17.2.0 (Dec. 2021), 5G, 270 pages.
(Continued)

*Primary Examiner* — Zewdu A Beyen
(74) *Attorney, Agent, or Firm* — Gray Ice Higdon, PLLC

(57) ABSTRACT

Various embodiments herein provide techniques related to an artificial intelligence application function (AI AF) and an artificial intelligence function (AIF) in a cellular network. In embodiments, the cellular network may be a fifth generation (5G) network, a sixth generation (6G) network or some other beyond-5G network. Other embodiments may be described and/or claimed.

20 Claims, 12 Drawing Sheets

(56)                    References Cited

OTHER PUBLICATIONS

3GPP, "Technical Specification Group Services and System Aspects; Architectural enhancements for 5G multicast-broadcast services; Stage 2 (Release 17)," 3GPP TS 23.247 V17.1.0 (Dec. 2021), 5G, 102 pages.

3GPP, "Technical Specification Group Services and System Aspects; Support of Uncrewed Aerial Systems (UAS) connectivity, identification and tracking; Stage 2 (Release 17)," 3GPP TS 23.256 V17.1.0 (Dec. 2021), 5G, 52 pages.

3GPP, "Technical Specification Group Services and System Aspects; 5G System (5GS) Location Services (LCS); Stage 2 (Release 17)," 3GPP TS 23.273 V17.3.0 (Dec. 2021), 5G, 100 pages (Atty ref No. AE2008-Z).

3GPP, "Technical Specification Group Services and System Aspects; Architecture enhancements for 5G System (5GS) to support Vehicle-to-Everything (V2X) services (Release 17)," 3GPP TS 23.287 V17.2.0 (Dec. 2021), 5G, 60 pages.

3GPP, "Technical Specification Group Services and System Aspects; Architecture enhancements for 5G System (5GS) to support network data analytics services (Release 17)," 3GPP TS 23.288 V17.3.0 (Dec. 2021), 5G, 204 pages.

3GPP, "Technical Specification Group Services and System Aspects; Proximity based Services (ProSe) in the 5G System (5GS) (Release 17)," 3GPP TS 23.304 V17.1.1 (Jan. 2022), 5G, 99 pages.

3GPP, "Technical Specification Group Services and System Aspects; System architecture for the 5G System (5GS); Stage 2 (Release 17)," 3GPP TS 23.501 V17.3.0 (Dec. 2021), 5G, 559 pages.

3GPP, "Technical Specification Group Services and System Aspects; Procedures for the 5G System (5GS); Stage 2 (Release 17)," 3GPP TS 23.502 V17.3.0 (Dec. 2021), 5G, 727 pages.

3GPP, "Technical Specification Group Services and System Aspects; Policy and charging control framework for the 5G System (5GS); Stage 2 (Release 17)," 3GPP TS 23.503 V17.3.0 (Dec. 2021), 5G, 144 pages.

3GPP, "Technical Specification Group Services and System Aspects; 5G System Enhancements for Edge Computing; Stage 2 (Release 17)," 3GPP TS 23.548 V17.1.0 (Dec. 2021), 5G, 55 pages.

3GPP, "Technical Specification Group Services and System Aspects; Telecommunication management; Charging management; 5G data connectivity domain charging; stage 2 (Release 17)," 3GPP TS 32.255 V17.4.1 (Jan. 2022), 5G, 131 pages.

3GPP, "Technical Specification Group Services and System Aspects; Charging management; 5G connection and mobility domain charging; stage 2 (Release 16)," 3GPP TS 32.256 V16.2.0 (Mar. 2021), 5G, 50 pages.

3GPP, "Technical Specification Group Services and System Aspects; Telecommunication management; Subscriber and equipment trace; Trace concepts and requirements (Release 17)," 3GPP TS 32.421 V17.3.0 (Dec. 2021), 5G, 49 pages.

* cited by examiner

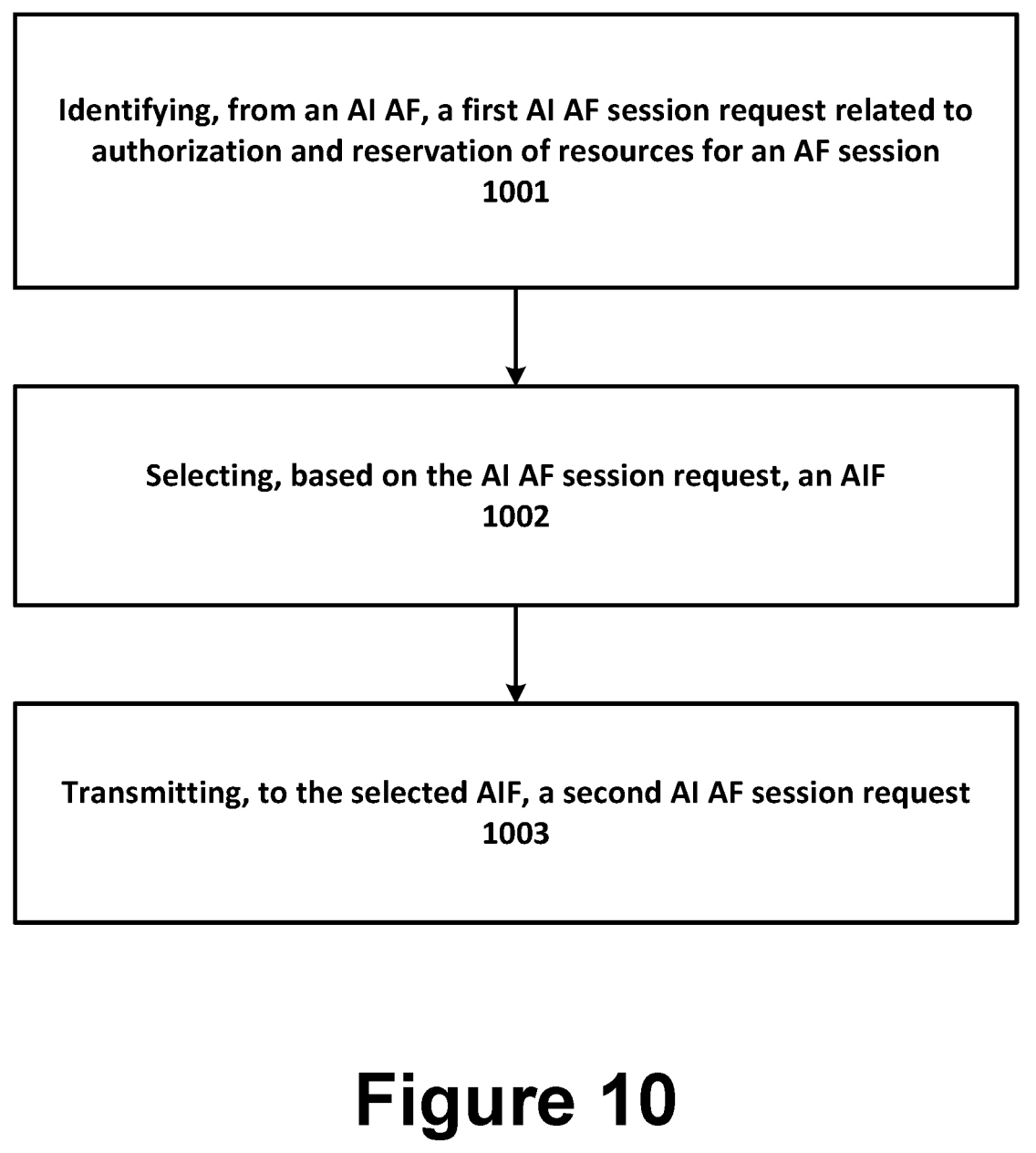

Identifying, from an AI AF, a first AI AF session request related to authorization and reservation of resources for an AF session
1001

Selecting, based on the AI AF session request, an AIF
1002

Transmitting, to the selected AIF, a second AI AF session request
1003

Figure 10

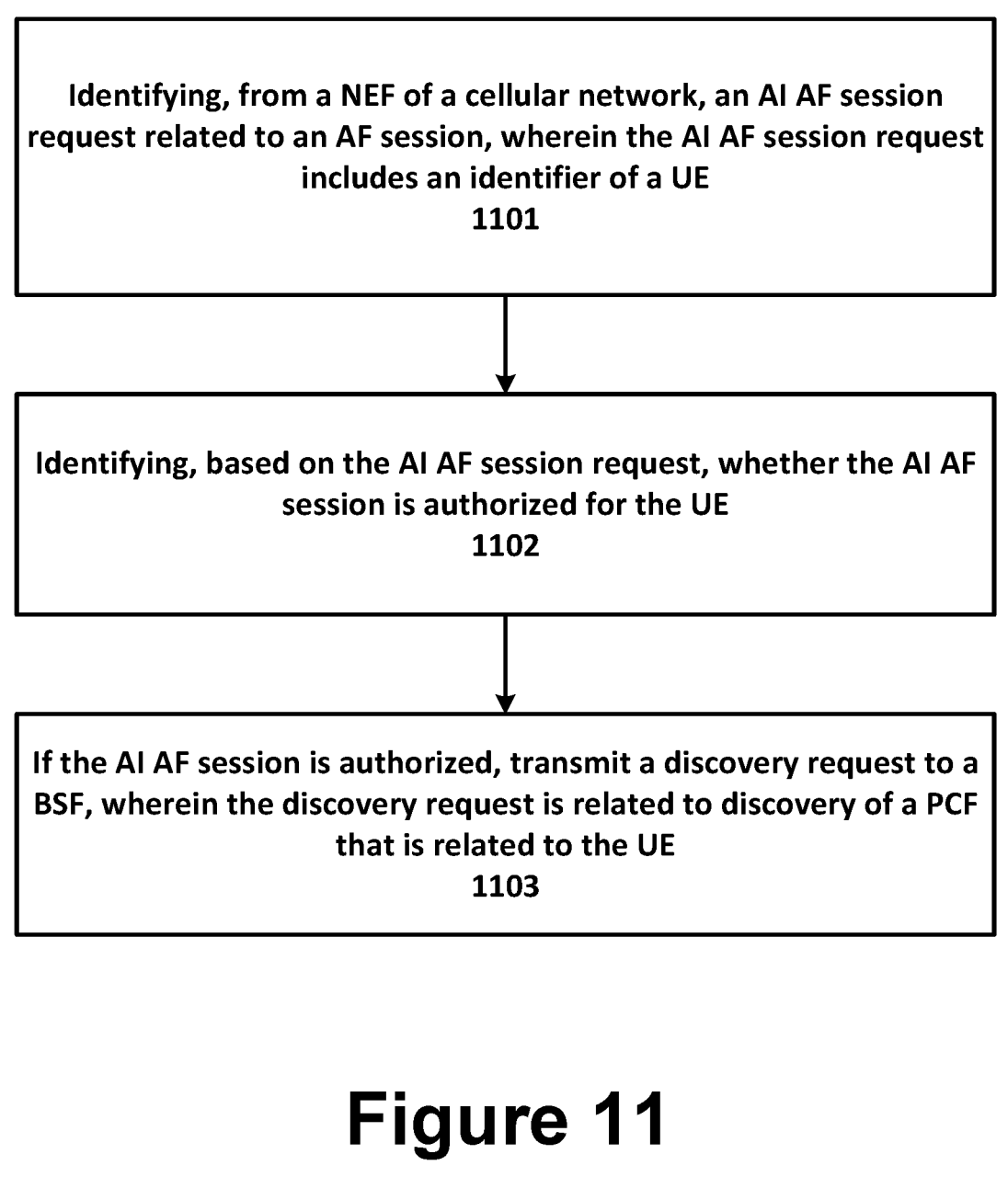

Identifying, from a NEF of a cellular network, an AI AF session request related to an AF session, wherein the AI AF session request includes an identifier of a UE
1101

Identifying, based on the AI AF session request, whether the AI AF session is authorized for the UE
1102

If the AI AF session is authorized, transmit a discovery request to a BSF, wherein the discovery request is related to discovery of a PCF that is related to the UE
1103

Figure 11

POLICY ENHANCEMENT TO SUPPORT GROUP APPLICATION FUNCTION (AF) SESSION FROM ARTIFICIAL INTELLIGENCE/MACHINE LEARNING (AIML) PROVIDER AF WITH REQUIRED QUALITY OF SERVICE (QOS)

CROSS REFERENCE TO RELATED APPLICATION

The present application claims priority to U.S. Provisional Patent Application No. 63/311,203, which was filed Feb. 17, 2022; U.S. Provisional Patent Application No. 63/318,265, which was filed Mar. 9, 2022; the disclosures of which are hereby incorporated by reference.

FIELD

Various embodiments generally may relate to the field of wireless communications. For example, some embodiments may relate to support of a group application function (AF) session. In some embodiments, such support may relate to or be provided by an artificial intelligence/machine learning (AIML or AI/ML) provider application function (AF).

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 10 depicts an example technique, in accordance with various embodiments.

FIG. 11 depicts an alternative example technique, in accordance with various embodiments.

DETAILED DESCRIPTION

Figure 1A:
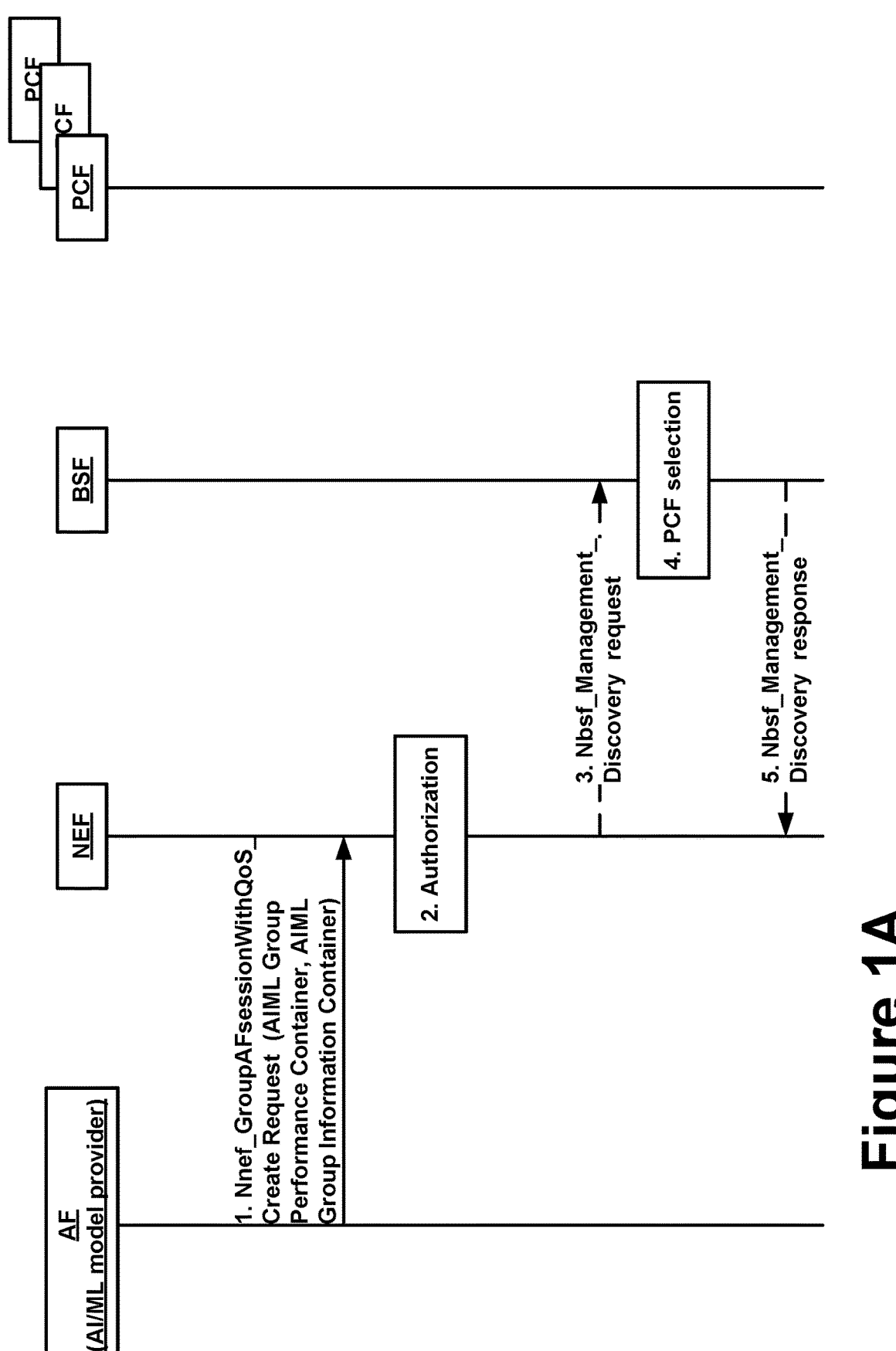
FIGS. 1A and 1B (collectively, "FIG. 1") depict an example communication flow related to support of a group application function (AF) session, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In the third generation partnership project (3GPP) Release-18 (Rel-18) specifications, it may be desirable need to allow the artificial intelligence/machine learning (AI/ML) Services & Transmissions with fifth generation (5G) system (5GS) assistance to support AI/ML model distribution, transfer, training for various applications e.g. video/speech recognition, robot control, automotive etc for the following three example types of AI/ML operations (although, in other embodiments, such support may be desirable in additional/alternative AI/ML operations):

a. AI/ML operation splitting between AI/ML endpoints b. AI/ML model/data distribution and sharing over a 5G system c. Distributed/Federated Learning (FL) over a 5G system It may also be desirable to enact one or more policy enhancements to support Application AI/ML operational traffic while supporting regular (non-Application-AI/ML) 5GS user traffic.

Embodiments herein relate to solutions for 5GS policy enhancements and associated procedures to support Application AI/ML operational traffic between an AL/ML model provider and a user equipment (UE).

In order to support Distributed Learning/Federated Learning over 5GS the following example use cases may be considered:

Case 1: The AIML AF provides an external Group identifier (ID) and a list of member UEs selected for the group (example—Federated Learning between two end points—AF and the UEs).

Case 2: The AIML AF provides the external Group ID only without the list of member UEs. Other group information parameters provided by the AIML AF may include location information i.e., area of interest. In this case, the 5GC provides a list of potential member UEs to the AIML AF. The AIML AF may select the member UEs to participate in the group (for a certain iteration). The decision of whether the AIML AF selects the list of potential member UEs provided by the 5GS is left to the logic decision supported by AIML AF. Once the AIML AF has selected the member UEs to participate in the group, case 1 can be applied. AIML Group performance container from AF to the 5GC:

TABLE 1

| AIML group performance container | |
| --- | --- |
| Information | Description |
| Maximum Requested bandwidth UL | Maximum desired bandwidth UL for all UEs in the AIML group |
| Maximum Requested bandwidth DL | Maximum desired bandwidth DL for all UEs in the AIML group |
| Maximum latency for the AIML group | Maximum reporting delay acceptable from all the UEs in the AIML group |
| Maximum packet loss rate in UL | Maximum packet loss rate acceptable in the UL for UEs in the AIML group |
| Maximum packet loss rate in DL | Maximum packet loss rate acceptable in the DL for UEs in the AIML group |
| Desired time for the requested QoS | Time for which the requested QoS needs to be guaranteed for all the UEs in the AIML group |
| Minimum number of UEs in the AIML group | Indicates the minimum number of UEs which needs to guarantee the requested QoS in the AIML group |

The consumer endpoint for AIML Group performance container from AF is the PCF in 5GC.

AIML Group information container from AF to 5GC:

TABLE 2

| AIML group information container | |
| --- | --- |
| Information | Description |
| External Group Identifier | Identifies the AIML group. |
| Member UEs of the group | When included, it includes a list of UEs chosen by the AF for group participation (example - Federated Learning group) (Case 1) |
| Member UEs added to the group | When included, it lists of UEs added to an existing group |
| Member UEs removed from the group | When included, it lists UEs removed from an existing group |
| Area of interest | Included when the AF provides only External Group Identifier (Case 2) |

The consumer endpoint for AIML information container from AF is the NEF or Group management function (new 5GC network function defined in Solution 3) the in 5GC.

Figure 1B:
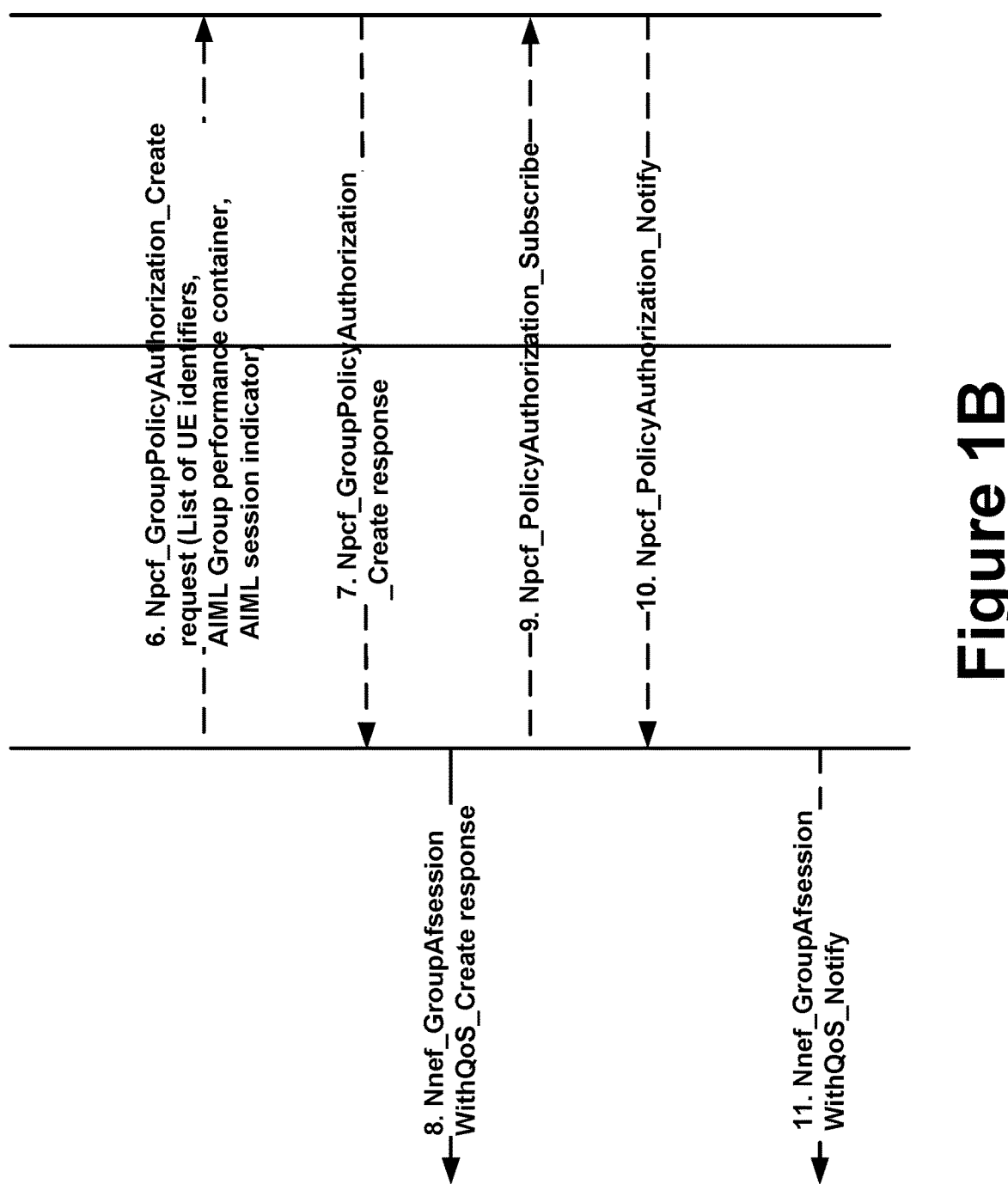

Case 1: The AIML AF provides the external Group ID and the list of member UEs selected for the group. The below describes, with reference to FIG. 1, an example process flow between the AIML AF, a network exposure function (NEF), a binding support function (BSF), and one or more policy control functions (PCFs):

1. The ML provider AF sends a request to reserve resources for multiple AF session using Nnef_GroupAFsessionWithQoS_Create request message ([External Group ID or UE addresses], AF Identifier, Flow description(s) or External Application Identifier, QoS Reference, DNN, S-NSSAI, AIML Group performance container, AIML Group Information container) to the NEF. The AF may provide an external group ID mapped to the target UE identifiers by the NEF or the AF may provide a list of UE addresses mapped to the internal UE identifier by the NEF. The AIML Group performance container may contain one or more group parameters as shown in Table 2. It includes maximum requested bandwidth UL, maximum requested bandwidth Dl, maximum latency, maximum PLR UL, maximum PLR DL, desired time for the requested QoS. Minimum number of UEs in the group. The desired time for the requested QoS is determined by the ML provider AF based on the tolerance for dropout UEs for a given round i.e., the duration of time after which the reserved resources in the 5GC with respect to the group is released if certain UEs belonging to the ALML group do not respond or report to the AF. The AIML Group performance container is sent transparently from the AF to the PCF (via the NEF for $3^{rd}$ party AF). AIML Group Information container is sent from the AF to the NEF and contains information on the member UEs belonging to the group identified by the External Group Identifier.

2. The NEF authorizes the AF request and may apply policies to control the overall amount of QoS authorized for the AF. If the authorization is not granted the NEF replies to the AF with a Result value indicating that the authorization failed.

3. The NEF use the list of UE addresses in element 1 to sends a Nbsf_Management_Discovery request to BSF to discover the PCF(s) serving the UEs.

If the AF is considered to be trusted by the operator, the AF uses the Npcf_PolicyAuthorization_Create request message to interact directly with PCF(s) to request reserving resources for an AF session or sends a Nbsf_Management_Discovery request to BSF to discover the PCF(s) serving the UEs.

4. The BSF performs PCF discovery based on the input provided by the NEF in element 3.

5. The BSF sends a Nbsf_Management_Discovery response including the list of PCF(s) serving the group of UEs (provided by the AF).

If the AF is considered to be trusted by the operator, the BSF sends a Nbsf_Management_Discovery response including the list of PCF(s) serving the group of UEs (provided by the AF).

6. The NEF interacts with the PCF(s) by triggering a Npcf_GroupPolicyAuthorization_Create request and provides UE address(es), AF Identifier, Flow description(s), the QoS Reference, the optional Alternative Service Requirements, AIML Group performance container from element 1, AIML session indicator. The UE address(es) includes all the UEs belonging to the AIML group served by the PCF. The NEF includes AIML session indicator if the Nnef_GroupAFsessionWithQoS_Create request in element 1 includes the AIML Group Performance container.

7. For requests received from the NEF in element 6, the PCF determines whether the request is authorized and notifies the NEF if the request is not authorized. The response from the PCF includes the list of UE(s) for which the policy authorization has failed and includes the reason for failure. If the request is authorized, the PCF derives the required QoS parameters based on the information provided in the ALML group performance container and determines whether this QoS is allowed (according to the PCF configuration) and notifies the result to the NEF.

When the PCF authorizes the service information from the AF, it generates a PCC rule by deriving the QoS parameters of the PCC rule based on the service information, information in the AIML Group container where the AIML Group performance container contains the AIML Group QoS information.

If the request is not authorized, or the required QoS is not allowed, NEF responds to the AF in element 8 with a Result value indicating the failure cause, list of UEs for which the policy authorization at the PCF failed.

If the AF is considered to be trusted by the operator, the PCF sends the Npcf_PolicyAuthorization_Update response message directly to AF.

If the PCF determines that the SMF needs updated policy information, the PCF issues a Npcf_SMPolicyControl_UpdateNotify request with updated policy information about the PDU Session. The QoS flow binding shall ensure that, when the PCF provisions the PCC rule in SMF which contains the AIML group performance container and AIML session indicator, the PCC rule is bound to a new QoS Flow and no other PCC rule is bound to this QoS Flow.

Elements 6 and 7 are repeated for all the PCF(s) identified in element 5.

8. The NEF keeps track of the result included in element 7 from all the PCFs identified in element 5. If minimum UEs in the group with requested QoS parameter is provided in element 1, and the results from all PCFs matches or exceeds the minimum UEs in the group with requested QoS parameter, the NEF sends a Nnef_GroupAFsessionWithQoS_Create response message (Transaction Reference ID, Result, [UEs in the group for which the QoS is granted]) to the AF where the Result indicates that the request is granted. The UEs in the group for which the QoS is granted parameter is included in the response only when the response from PCF(s) to NEF in element 7 indicates required QoS for UE(s) is not allowed for all the UEs belonging to the AIML group (provided as input in element 1).

9. The NEF shall send a Npcf_PolicyAuthorization_Subscribe message to the PCF(s) to subscribe to notifications of Resource allocation status. The PCF responds with a Subscription Correlation ID which allows the NEF to track all the subscription notification unique to each UE in the AIML group.

10. When the event condition is met, e.g., the establishment of the transmission resources corresponding to the QoS update succeeded or failed, the QoS target can no longer be fulfilled, QoS monitoring parameters the PCF sends Npcf_PolicyAuthorization_Notify message to the NEF notifying about the event. The PCF includes the event information and Notification correlation information (identify the AIML group application session)

If the operator trusts the AF, the PCF(s) sends the Npcf_PolicyAuthorization_Notify message directly to AF.

11. When the NEF receives the Npcf_PolicyAuthorization_Notify for all the UEs for the request was granted in element 8, the NEF sends Nnef_GroupAFsessionWithQoS_Notify message with the event reported by the PCF(s) to the AF i.e., QoS resource allocated for all the UEs for which the request was granted in element 8 with the Transaction Reference ID.

Example PCC Rule Information in 5GC:

The following provides example PCC rule information:

| Information name | Description | Category | PCF permitted to modify for a dynamic PCC rule in the SMF | Differences compared with table 6.3. in TS 23.203 [4] |
|---|---|---|---|---|
| Rule identifier | Uniquely identifies the PCC rule, within a PDU Session. It is used between PCF and SMF for referencing PCC rules. | Mandatory | No | |
| Service data flow detection | This part defines the method for detecting packets belonging to a service data flow. | | | |
| Precedence | Determines the order, in which the service data flow templates are applied at service data flow detection, enforcement and charging. (NOTE 1). | Conditional (NOTE 2) | Yes | |
| Service data flow template | For IP PDU traffic: Either a list of service data flow filters or an application identifier that references the corresponding application detection filter for the detection of the service data flow. For Ethernet PDU traffic: Combination of traffic patterns of the Ethernet PDU traffic. It is defined in clause 5.7.6.3 of TS 23.501 [2]. | Mandatory (NOTE 3) | Conditional (NOTE 4) | Modified (packet filters for Ethernet PDU traffic added) |
| Mute for notification | Defines whether application's start or stop notification is to be muted. | Conditional (NOTE 5) | No | |
| Charging | This part defines identities and instructions for charging and accounting that is required for an access point where flow based charging is configured | | | |
| Charging key (NOTE 22) | The charging system (CHF) uses the charging key to determine the tariff to apply to the service data flow. | | Yes | |
| Service identifier | The identity of the service or service component the service data flow in a rule relates to. | | Yes | |

-continued

| Information name | Description | Category | PCF permitted to modify for a dynamic PCC rule in the SMF | Differences compared with table 6.3. in TS 23.203 [4] |
|---|---|---|---|---|
| Sponsor Identifier | An identifier, provided from the AF which identifies the Sponsor, used for sponsored flows to correlate measurements from different users for accounting purposes. | Conditional (NOTE 6) | Yes | |
| Application Service Provider Identifier | An identifier, provided from the AF which identifies the Application Service Provider, used for sponsored flows to correlate measurements from different users for accounting purposes. | Conditional (NOTE 6) | Yes | |
| Charging method | Indicates the required charging method for the PCC rule. Values: online or offline or neither. | Conditional (NOTE 7) | No | |
| Service Data flow handling while requesting credit | Indicates whether the service data flow is allowed to start while the SMF is waiting for the response to the credit request. Only applicable for charging method online. Values: blocking or non-blocking | | No | New |
| Measurement method | Indicates whether the service data flow data volume, duration, combined volume/duration or event shall be measured. This is applicable to reporting, if the charging method is online or offline. Note: Event based charging is only applicable to predefined PCC rules and PCC rules used for application detection filter (i.e. with an application identifier). | | Yes | |
| Application Function Record Information | An identifier, provided from the AF, correlating the measurement for the Charging key/Service identifier values in this PCC rule with application level reports. | | No | |
| Service Identifier Level Reporting | Indicates that separate usage reports shall be generated for this Service Identifier. Values: mandated or not required | | Yes | |
| Policy control | This part defines how to apply policy control for the service data flow. | | | |
| Gate status | The gate status indicates whether the service data flow, detected by the service data flow template, may pass (Gate is open) or shall be discarded (Gate is closed). | | Yes | |
| 5G QoS Identifier (5QI) | The 5QI authorized for the service data flow. | Conditional (NOTE 10) | Yes | Modified (corresponds to QCI in TS 23.203 [4]) |
| QoS Notification Control (QNC) | Indicates whether notifications are requested from 3GPP RAN when the GFBR can no longer (or can again) be guaranteed for a QoS Flow during the lifetime of the QoS Flow. | Conditional (NOTE 15) | Yes | Added |

-continued

| Information name | Description | Category | PCF permitted to modify for a dynamic PCC rule in the SMF | Differences compared with table 6.3. in TS 23.203 [4] |
|---|---|---|---|---|
| Reflective QoS Control | Indicates to apply reflective QoS for the SDF. | | Yes | Added |
| UL-maximum bitrate | The uplink maximum bitrate authorized for the service data flow | | Yes | |
| DL-maximum bitrate | The downlink maximum bitrate authorized for the service data flow | | Yes | |
| UL-guaranteed bitrate | The uplink guaranteed bitrate authorized for the service data flow | | Yes | |
| DL-guaranteed bitrate | The downlink guaranteed bitrate authorized for the service data flow | | Yes | |
| UL sharing indication | Indicates resource sharing in uplink direction with service data flows having the same value in their PCC rule | | No | |
| DL sharing indication | Indicates resource sharing in downlink direction with service data flows having the same value in their PCC rule | | No | |
| Redirect | Redirect state of the service data flow (enabled/disabled) | Conditional (NOTE 8) | Yes | |
| Redirect Destination | Controlled Address to which the service data flow is redirected when redirect is enabled | Conditional (NOTE 9) | Yes | |
| ARP | The Allocation and Retention Priority for the service data flow consisting of the priority level, the pre-emption capability and the pre-emption vulnerability | Conditional (NOTE 10) | Yes | |
| Bind to QoS Flow associated with the default QoS rule | Indicates that the dynamic PCC rule shall always have its binding with the QoS Flow associated with the default QoS rule (NOTE 11). | | Yes | Modified (corresponds to bind to the default bearer in TS 23.203 [4]) |
| Bind to QoS Flow associated with the default QoS rule and apply PCC rule parameters | Indicates that the dynamic PCC rule shall always have its binding with the QoS Flow associated with the default QoS rule. It also indicates that the that the QoS related attributes of the PCC rule shall be applied to derive the QoS parameters of the QoS Flow associated with the default QoS rule instead of the PDU Session related parameters Authorized default 5QI/ARP. | Conditional (NOTE 17) | Yes | Added |
| PS to CS session continuity | Indicates whether the service data flow is a candidate for vSRVCC. | | | Removed |
| Priority Level | Indicates a priority in scheduling resources among QoS Flows (NOTE 14). | | Yes | Added |
| Averaging Window | Represents the duration over which the guaranteed and maximum bitrate shall be calculated (NOTE 14). | | Yes | Added |
| Maximum Data Burst Volume | Denotes the largest amount of data that is required to be transferred within a period of 5G-AN PDB (NOTE 14). | | Yes | Added |
| Disable UE notifications at changes related to Alternative QoS Profiles | Indicates to disable QoS Flow parameters signalling to the UE when the SMF is notified by the NG-RAN of changes in the fulfilled QoS situation. The fulfilled situation is either the | Conditional (NOTE 25) | Yes | Added |

| Information name | Description | Category | PCF permitted to modify for a dynamic PCC rule in the SMF | Differences compared with table 6.3. in TS 23.203 [4] |
|---|---|---|---|---|
| | QoS profile or an Alternative QoS Profile. | | | |
| Access Network Information Reporting | This part describes access network information to be reported for the PCC rule when the corresponding QoS Flow is established, modified or terminated. | | | |
| User Location Report | The serving cell of the UE is to be reported. When the corresponding QoS Flow is deactivated, and if available, information on when the UE was last known to be in that location is also to be reported. | | Yes | |
| UE Timezone Report | The time zone of the UE is to be reported. | | Yes | |
| Usage Monitoring Control | This part describes identities required for Usage Monitoring Control. | | | |
| Monitoring key (NOTE 23) | The PCF uses the monitoring key to group services that share a common allowed usage. | | Yes | |
| Indication of exclusion from session level monitoring | Indicates that the service data flow shall be excluded from PDU Session usage monitoring | | Yes | |
| N6-LAN Traffic Steering Enforcement Control (NOTE 18) | This part describes information required for N6-LAN Traffic Steering. | | | |
| Traffic steering policy identifier(s) | Reference to a pre-configured traffic steering policy at the SMF (NOTE 12). | | Yes | |
| AF influenced Traffic Steering Enforcement Control (NOTE 18) | This part describes information required for AF influenced Traffic Steering. | | | |
| Data Network Access Identifier | Identifier(s) of the target Data Network Access (DNAI). It is defined in clause 5.6.7 of TS 23.501 [2]. | | Yes | Added |
| Per DNAI: Traffic steering policy identifier | Reference to a pre-configured traffic steering policy at the SMF (NOTE 19). | | Yes | Added |
| Per DNAI: N6 traffic routing information | Describes the information necessary for traffic steering to the DNAI. It is described in clause 5.6.7 of TS 23.501 [2] (NOTE 19). | | Yes | Added |
| Information on AF subscription to UP change events | Indicates whether notifications in the case of change of UP path are requested and optionally indicates whether acknowledgment to the notifications shall be expected (as defined in clause 5.6.7 of TS 23.501 [2]). | | Yes | Added |
| Indication of UE IP address preservation | Indicates UE IP address should be preserved. It is defined in clause 5.6.7 of TS 23.501 [2]. | | Yes | Added |

-continued

| Information name | Description | Category | PCF permitted to modify for a dynamic PCC rule in the SMF | Differences compared with table 6.3. in TS 23.203 [4] |
|---|---|---|---|---|
| Indication of traffic correlation | Indicates that the target PDU Sessions should be correlated via a common DNAI in the user plane. It is described in clause 5.6.7 of TS 23.501 [2]. | | Yes | Added |
| Information on User Plane Latency requirements | Indicates the user plane latency requirements. It is defined in clause 6.3.6 of TS 23.548 [33]. | | Yes | Added |
| Indication for Simultaneous Connectivity at Edge Relocation | Indicates request for simultaneous connectivity over source and target PSA from the AF (see clause 5.6.7 of TS 23.501 [2]). | | Yes | Added |
| Information for EAS IP Replacement in 5GC | Indicates the Source EAS identifier and Target EAS identifier, (i.e. IP addresses and port numbers of the source and target EAS). (see clause 5.6.7 of TS 23.501 [2]). | | Yes | Added |
| NBIFOM related control Information | This part describes PCC rule information related with NBIFOM. | | | |
| Allowed Access Type | The access to be used for traffic identified by the PCC rule. | | | Removed |
| RAN support information | This part defines information supporting the RAN for e.g. handover threshold decision. | | | |
| UL Maximum Packet Loss Rate | The maximum rate for lost packets that can be tolerated in the uplink direction for the service data flow. It is defined in clause 5.7.2.8 of TS 23.501 [2]. | Conditional (NOTE 13) | Yes | |
| DL Maximum Packet Loss Rate | The maximum rate for lost packets that can be tolerated in the downlink direction for the service data flow. It is defined in clause 5.7.2.8 of TS 23.501 [2]. | Conditional (NOTE 13) | Yes | |
| MA PDU Session Control (NOTE 20) | This part defines information supporting control of MA PDU Sessions | | Yes | New |
| Application descriptors | Identifies the application traffic for which MA PDU Session control is required based on the Steering Functionality, the Steering Mode, Steering Mode Indicator and Threshold Values. It is described in clause 5.32.8 of TS 23.501 [2]. | Conditional (NOTE 27) | Yes | New |
| Steering Functionality | Indicates the applicable traffic steering functionality. | Conditional (NOTE 21) | Yes | New |
| Steering Mode | Indicates the rule for distributing traffic between accesses together with associated steering parameters (if any). | Conditional (NOTE 21) | Yes | New |
| Steering Mode Indicator | Indicates either autonomous load-balance operation or UE-assistance operation, if the Steering Mode is set to "Load Balancing", as defined in TS 23.501 [2]. | | Yes | New |
| Threshold Values | A Maximum RTT or a Maximum Packet Loss Rate or both. | | Yes | New |
| Charging key for Non-3GPP access (NOTE 22) | Indicates the Charging key used for charging packets carried via Non-3GPP access for a MA PDU Session. | | Yes | New |

-continued

| Information name | Description | Category | PCF permitted to modify for a dynamic PCC rule in the SMF | Differences compared with table 6.3. in TS 23.203 [4] |
|---|---|---|---|---|
| Monitoring key for Non-3GPP access (NOTE 23) QoS Monitoring for URLLC | Indicates the Monitoring key used to monitor usage of the packets carried via Non-3GPP access for a MA PDU Session. This part describes PCC rule information related with QoS Monitoring for URLLC. | | Yes | New |
| QoS parameter(s) to be measured | UL packet delay, DL packet delay or round trip packet delay. | | Yes | Added |
| Reporting frequency | Defines the frequency for the reporting, such as event triggered, periodic, when no packet delay measurement result is received for a delay exceeding a threshold, or when the PDU Session is released. | | Yes | Added |
| Target of reporting | Defines the target of the QoS Monitoring reports, it can be the PCF or the AF or the Local NEF, decided by the PCF. | | Yes | Added |
| Indication of direct event notification | Indicates that the QoS Monitoring event shall be reported by the UPF directly to the NF indicated by the Target of reporting. | | Yes | Added |
| Alternative QoS Parameter Sets (NOTE 24) (NOTE 26) | This part defines Alternative QoS Parameter Sets for the service data flow. | | | |
| Packet Delay Budget | The Packet Delay Budget in this Alternative QoS Parameter Set. | | Yes | Added |
| Packet Error Rate | The Packet Error Rate in this Alternative QoS Parameter Set. | | Yes | Added |
| UL-guaranteed bitrate | The uplink guaranteed bitrate in this Alternative QoS Parameter Set. | | Yes | Added |
| DL-guaranteed bitrate | The downlink guaranteed bitrate in this Alternative QoS Parameter Set. | | Yes | Added |
| TSC Assistance Container | This part defines parameters provided by TSN AF or TSCTSF. The parameters are defined in clause 5.27.2 of TS 23.501 [2]. | | No | Added |
| AIML Group performance container | This part defines parameters provided by AIML AF (Table 1) | | Yes | New |
| AIML Session Indicator | This part defines parameters provided by AI AF | Conditional (Only applicable for AIML AF sessions) | | New |
| Downlink Data Notification Control | This part describes information required for controlling the sending of Downlink data delivery status event and DDN Failure event notifications as specified in clause 4.15.3 of TS 23.502 [3]. | | | |
| Notification control for DDD status | Indicates that notifications of downlink data delivery status are required and the requested type of such notifications. | | Yes | Added |
| Notification Control for DDN Failure | Indicates that notifications of DDN Failure are required. | | Yes | Added |

Alternative Example Process Flow:

The following describes an alternative example process flow that may be used, in accordance with various embodiments. The process flow may include elements 1-6 and elements 8-11 as described above with respect to FIG. 1. However, element 7 may be different as follow:

7. For requests received from the NEF in element 6, the PCF determines whether the request is authorized and notifies the NEF if the request is not authorized. If the request is authorized, PCF derives the required QoS parameters based on the information provided in the ALML group performance container determines whether this QoS is allowed (according to the PCF configuration) and notifies the result to the NEF.

When the PCF authorizes the service information from the AF, it generates a PCC rule by deriving the QoS parameters of the PCC rule based on the service information and information in the AIML Group performance container. The PCC rule generated by the PCF is applied to all UEs belonging to the AIML group served by the PCF.

If the request is not authorized, or the required QoS is not allowed, NEF responds to the AF in element 8 with a Result value indicating the failure cause.

If the AF is considered to be trusted by the operator, the PCF sends the Npcf_PolicyAuthorization_Update response message directly to AF.

If the PCF determines that the SMF needs updated policy information, the PCF issues a Npcf_SMPolicyControl_UpdateNotify request with updated policy information about the PDU session applicable to all the UEs which belong to the AIML group served by a given SMF about the PDU Session. The QoS flow binding shall ensure that, when the PCF provisions a AIML Group PCC rule in SMF which includes the AIML group container, the PCC rule is bound to a new QoS Flow and no other PCC rule is bound to this QoS Flow.

Elements 6 and 7 are repeated for all the PCF(s) identified in element 5.

Npcf_SMPolicyControl_UpdateNotify Service Operation

Service operation name: Npcf_SMPolicyControl_UpdateNotify

Description: Provides to the NF Service Consumer, e.g. SMF updated Policy information for the PDU Session evaluated based on the information previously provided by the SMF, AF, CHF, UDR and NWDAF.

Inputs, Required: SM Policy Association ID (s).

Inputs, Optional: Policy information for the PDU Session (SUPI, PDU Session ID, DNN, S-NSSAI, RAT type).

Outputs, Required: Success or Failure.

Outputs, Optional: None.

The Npcf_SMPolicyControl_UpdateNotify request includes as input the SM Policy Association ID(s) of all the UEs served by the SMF which belong to the AIML Group.

Figure 2:
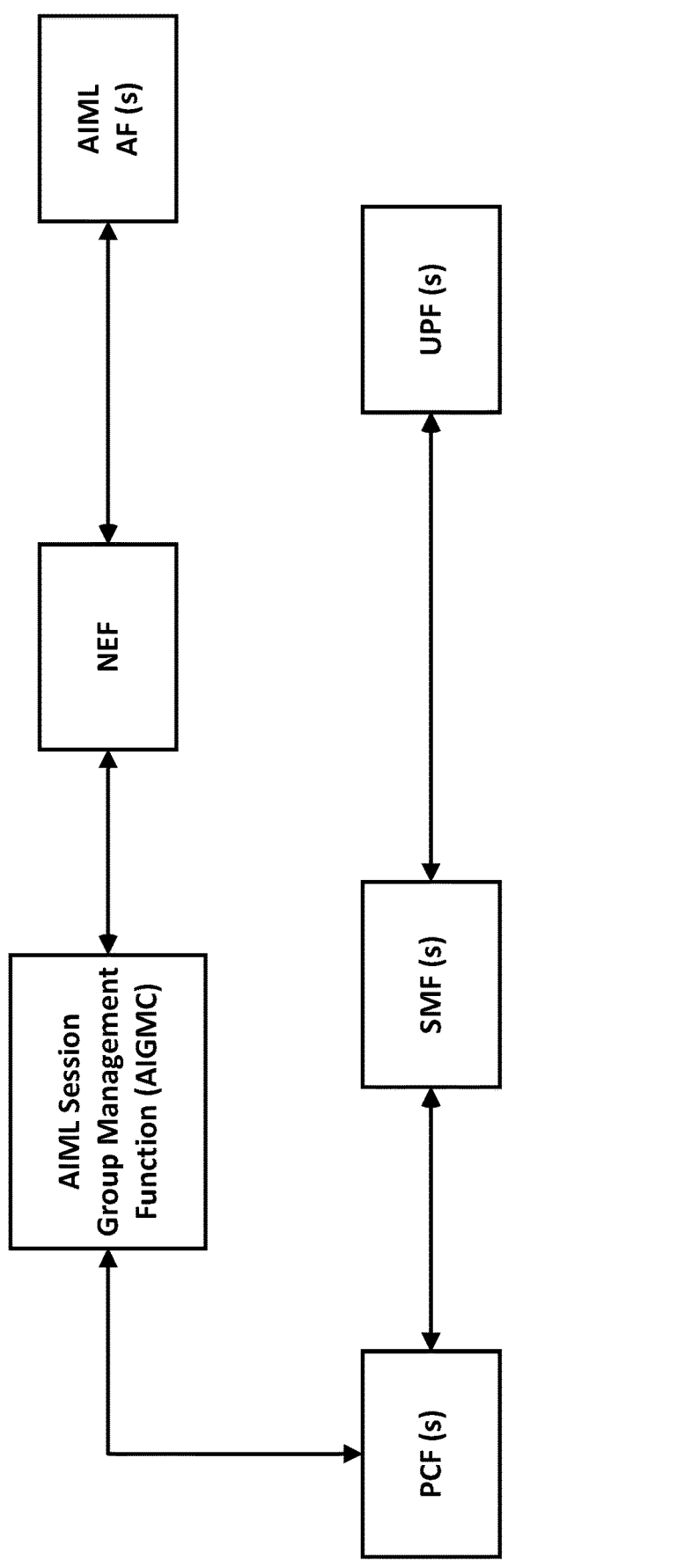
FIG. 2 depicts an example of communication between various network functions (NFs), in accordance with various embodiments.

Solution 3:

FIG. 2 depicts an example communication flow between various network functions, in accordance with this solution. In this embodiment, after element 1 as described with reference to FIG. 1 where the NEF receives Nnef_GroupAFsessionWithQoS_Create request message, the NEF forwards the request for group AF session to a new 5G network function (Group management function) which is responsible for the AIML group AF session management. The Group management function is responsible for mapping the External group ID to the UE identifiers which are the member of the AIML group based on the information in the AIML Group Information container, discovering the PCFs serving the AIML group member UEs included in the AIML Group Information container.

includes AIML session indicator in the policy authorization request or the group policy authorization request when the Group Management Function receives the Group AF session request from NEF includes the AIML Group Performance container.

For policy update from PCF to SMF, the alternative example described above with reference to the revised element 7 may also be applicable to Solution 3.

In other embodiments, the integration of AI components in the wireless communication system to allow cross domain network automation as well as support for plethora of AI/ML services supported by the 5G and beyond (e.g., 5G+, 6G, etc.) may be desired.

In the 3GPP release-16 or release-17 (Rel-16 or Rel-17) specifications, the network data analytics function (NWDAF) defined in the 5GC network architecture may support data collection from various 5G network functions and management functions to provide analytics that is used to support efficient network operation and better traffic management in the 5G network.

However, 3GPP Technical Report (TR) 22.874 describes various example use cases that may require the 5G network to assist AI/ML services for various applications in the data network. This assistance may only increase multiple folds in the sixth generation ( )6G era. There may be a need for the 5G core network to support the management and authorization of the AI/ML services and transmission between end devices and the AI/ML application functions (AFs) in the cloud. Various embodiments herein provide a new network entity to support management and authorization of AI/ML services and various solutions to allow efficient management of AI traffic between the end devices and the AF in the cloud with respect to the other non-AI traffic in the 5G network and 6G network.

Various embodiments herein provide a service-based framework in 5GS and 6GS to support a plethora of AI/ML services-based traffic from the data network.

Figure 3:
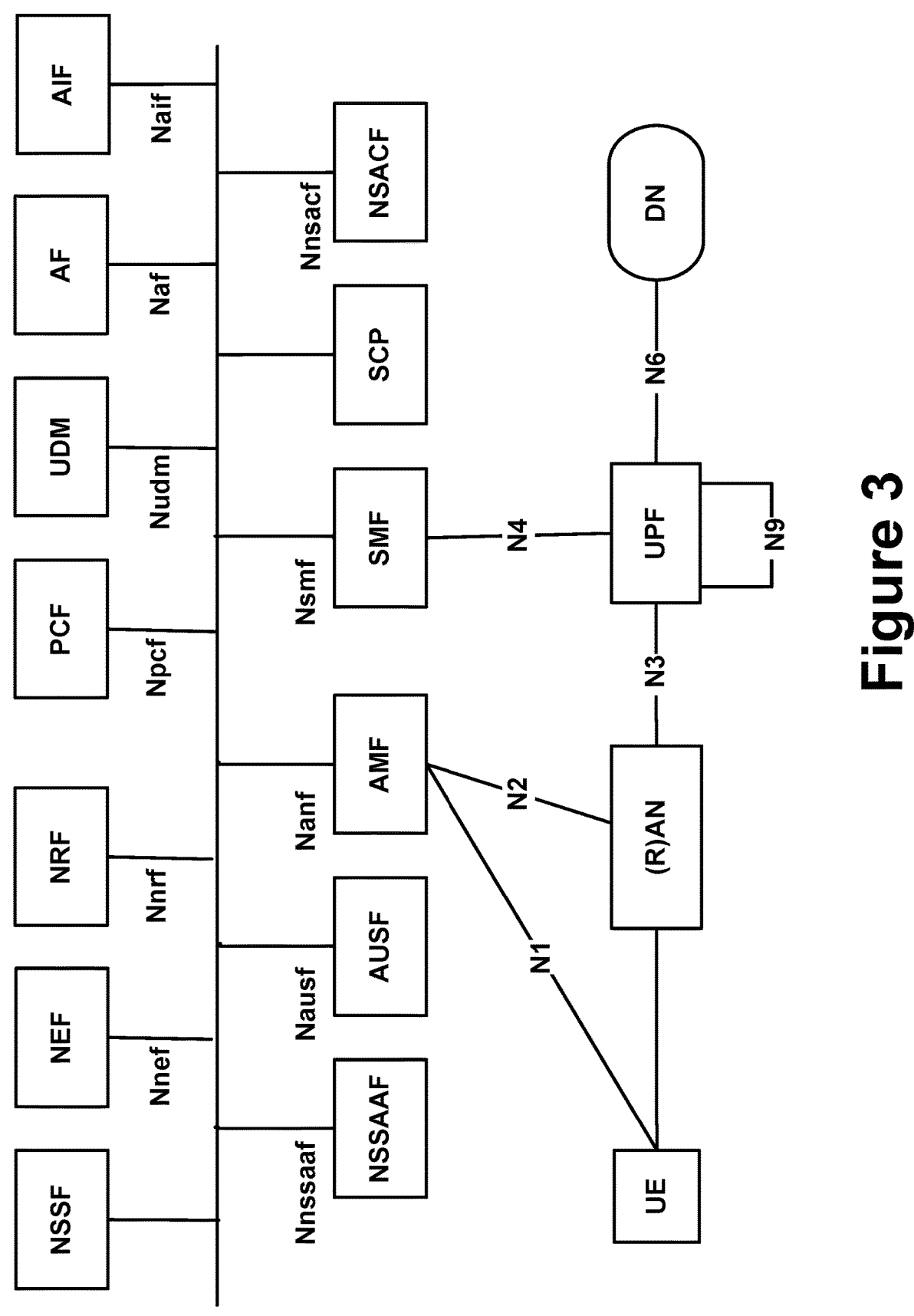
FIG. 3 depicts an example of a fifth generation (5G) system architecture with an artificial intelligence (AI) function (AIF), in accordance with various embodiments.

In FIG. 3 below, the AIF is depicted in relation to an example 5G core network. The AIF may support one or more of the following functions:

Support the AI group management for AF sessions from the AI Application Function. (The AI Application Function may be either a trusted AF or 3$^{rd}$ party Application Function supported via the NEF.) AI group management responsibility of AIF may include one or more of:

mapping the AF session request from AI Application Function for group, adding UEs to the group based on the request from AI Application Functions, removing UEs from the group based on the request from AI Application Functions, mapping the service requirement for AF session to the QoS requirement for a UE or group of UEs, report events to the AI Application Function when UE(s) are no more able to fulfil the QoS requirement set by the AI Application Function.

Support AI service authorization for a UE or a group of UEs belonging to an AF group. An example for AF group is Federated Learning application between AI Application Function in the cloud and numerous UEs constituting a group, can be called a FL group.

AIF (AI Function) Discovery and Selection:

The NF consumers (example—NEF) may utilize the NRF to discover AIF instance(s) unless AIF information is available by other means, e.g., locally configured in NF consumers. The NRF provides NF profile(s) of AIF instance(s) to the NF consumers.

One or more of the following factors may be considered for AIF selection:

S-NSSAI(s)

S-NSSAI(s) and DNN

External Group Identifier

Area of Interest

SUPI

Figure 4:
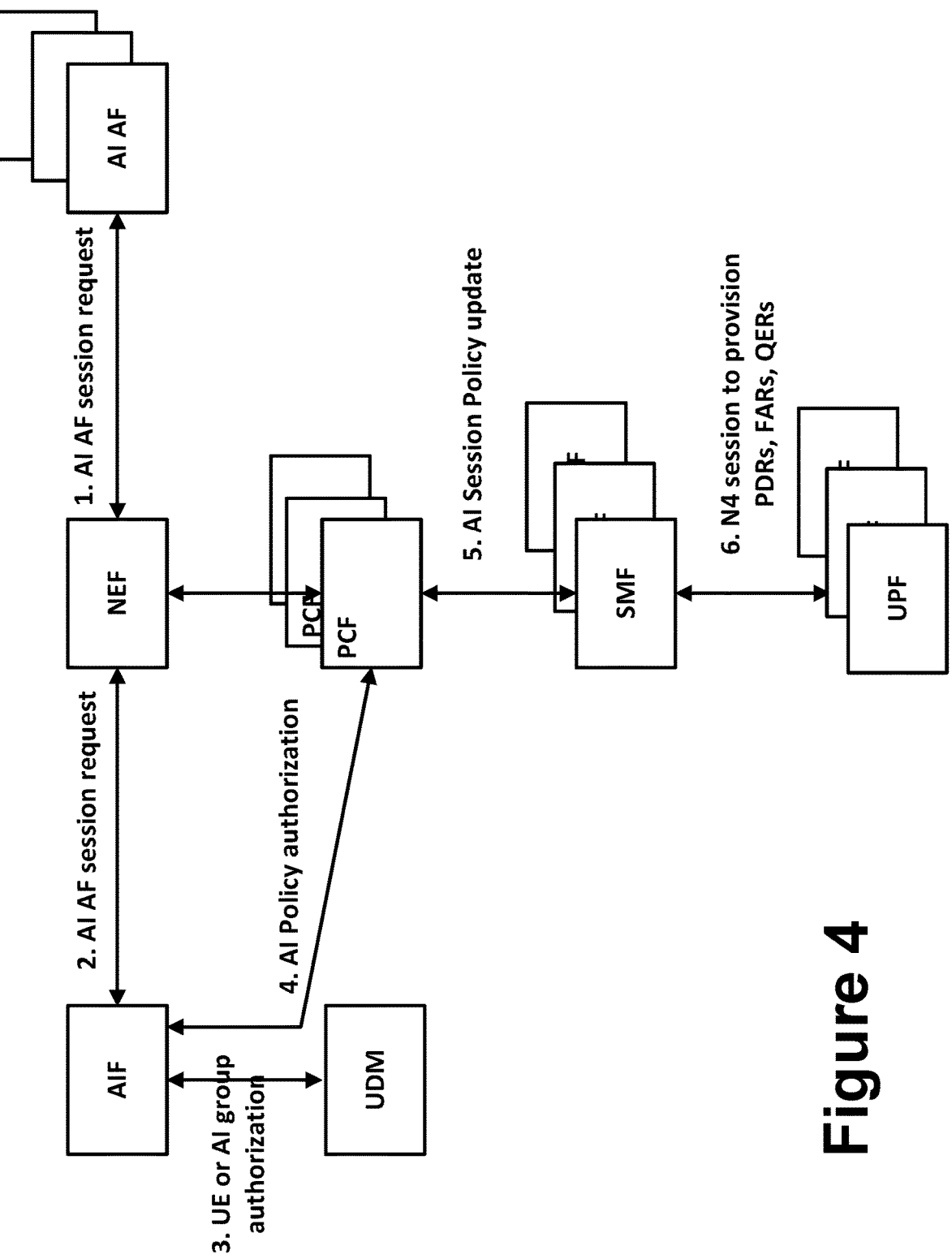
FIG. 4 depicts an example communication framework in a 5G core (5GC) to support an AI application function (AF), in accordance with various embodiments.

PCF Discovery and Selection:

PCF discovery and selection function is implemented in AIF. The AIF may utilize the NRF to discover the candidate PCF(s) instance for a UE or set of UEs belonging to an AI group. The AIF may select a PCF instance based on the available PCF instances obtained from the NRF or locally configured information in the AIF, depending on operator's policies. An example of a 5GC communication framework and the messages passed therein to support the AI AF is depicted in FIG. 4 and described below. It will be noted that this framework and message flow is intended as one example of such, and other embodiments may include more, fewer, or different elements or messages:

1. The AI AF sends an AI AF session request over the N33 interface to get authorization and reserve resources for AF session using Nnef_AFsessionauthorizationWithQoS_Create request message with a UE address, AF Identifier, Flow Description, DNN, S-NSSAI, AIML Group Container. The NEF assigns a Transaction Reference ID to the request, authorizes the request from AIAF and when the request includes an AIML Group Container, the NEF uses the NRF to discover the AIF by sending a Nnrf_NFDiscovery request to the NRF unless AIF information is available by other means, e.g., locally configured on NEF. The NRF provides NF profile of AIF instance(s) in the Nnrf_NFDiscovery response to the NEF.

2. The NEF selects an AIF based on the selection factors indicated above and sends Naif_AFSession Create request message which includes UE address, AF Identifier, Flow Description, DNN, S-NSSAI, AIML Group Container.

3. The AIF assigns a Transaction ID for the AI session and determines if the UE address included in the request is authorized for application layer AI operations. The AIF sends sends Nudm_AIServiceAuthorisation_Create request including the S-NSSAI, DNN and AI service type (Application Identifier) to the UDM. The UDM checks the S-NS-SAI, DNNs and the AI AF is authorized for the UE (Identifier translation in UDM subscription data type with the Application Identifier/Port ID info and Application data e.g., AI service specific information in UDR). The UDM responds with the AI service authorization result. If the authorization for fails for example the UE is not authorized for AI specific operations from AI AF (identifier/port ID) the UDM returns an appropriate error code, and the AIF rejects the Naif_AFSession Create request with a proper error code to inform the NEF about the request not authorized. The NEF in turn sends Nnef_AFsessionauthorizationWithQo-S_Create response with an error code to the AI AF that the request was not authorized.

4. If the service authorization in element 3 is successful, the AIF sends a Nbsf_Management_Discovery request to BSF to discover the PCF(s) serving the UEs. The BSF performs PCF discovery based on the input provided. The BSF sends a Nbsf_Management_Discovery response including the list of PCF(s) serving the UE. The AIF interacts with the PCF by triggering a Npcf_PolicyAuthorization_Update request and provides UE address, AF Identifier, the QoS requested in AIML Group Container for the AI AF session.

The PCF determines whether the request is authorized and notifies the AIF if the request is not authorized. If the request is authorized, the PCF generates a PCC rule or modifies the existing PCC rule based on the QoS information and other service information in the AIML Group container provided by the AIF.

5. If the PCF determines that the SMF serving the UE (provided by the AF) needs updated policy information, the PCF issues a Npcf_SMPolicyControl_UpdateNotify request with updated policy information about the PDU Session. The QoS flow binding shall ensure that, when the PCF provisions the PCC rule in SMF which contains the AIML session indicator, the PCC rule is bound to a new QoS Flow and no other PCC rule is bound to this QoS Flow. The PCF Npcf_PolicyAuthorization_Update response to the AIF with the result value. The AIF sends AI AFSession_Create response message with the result and Transaction ID for the session. The NEF sends the Nnef_AFsessionauthorization-WithQoS_Create response message with the result and Transaction Reference ID to the AI AF.

Example UE Subscription Data Types (TS 23.501)

| Subscription data type | Field | Description |
|---|---|---|
| Access and Mobility Subscription data (data needed for UE Registration and Mobility Management) | GPSI List | List of the GPSI (Generic Public Subscription Identifier) used both inside and outside of the 3GPP system to address a 3GPP subscription (see NOTE 9). |
| | Internal Group ID-list | List of the subscribed internal group(s) that the UE belongs to. |
| | Subscribed UE-AMBR | The maximum aggregated uplink and downlink MBRs to be shared across all Non-GBR QoS Flows according to the subscription of the user. |
| | Subscribed UE-Slice-MBR(s) | List of maximum aggregated uplink and downlink MBRs to be shared across all GBR and Non-GBR QoS Flows related to the same S-NSSAI according to the subscription of the user. There is a single uplink and a single downlink value per S-NSSAI. |
| | Subscribed S-NSSAIs | The Network Slices that the UE subscribes to. In the roaming case, it indicates the subscribed Network Slices |

-continued

| Subscription data type | Field | Description |
|---|---|---|
| | | applicable to the Serving PLMN (NOTE 11). |
| | Default S-NSSAIs | The Subscribed S-NSSAIs marked as default S-NSSAI. In the roaming case, only those applicable to the Serving PLMN (NOTE 12). |
| | S-NSSAIs subject to Network Slice-Specific Authentication and Authorization | The Subscribed S-NSSAIs marked as subject to NSSAA. When present, the GPSI list shall include at least one GPSI. |
| | Network Slice Simultaneous Registration Group Information | Optionally, for each S-NSSAI in the Subscribed S-NSSAIs, one or more value of Network Slice Simultaneous Registration Group(s) (NOTE 11) associated with the S-NSSAI. |
| | UE Usage Type | As defined in clause 5.15.7.2 of TS 23.501 [2]. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed Areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | CAG information | The CAG information includes Allowed CAG list and, optionally an indication whether the UE is only allowed to access 5GS via CAG cells as defined in clause 5.30.3 of TS 23.501 [2]. |
| | CAG information Subscription Change Indication | When present, indicates to the serving AMF that the CAG information in the subscription data changed and the UE must be updated. |
| | RFSP Index | An index to specific RRM configuration in the NG-RAN. |
| | Subscribed Periodic Registration Timer | Indicates a subscribed Periodic Registration Timer value, which may be influenced by e.g. network configuration parameter as specified in clause 4.15.6.3a. |
| | Subscribed Active Time | Indicates a subscribed active time value, which may be influenced by e.g. network configuration parameter as specified in clause 4.15.6.3a. |
| | MPS priority | Indicates the user is subscribed to MPS as indicated in clause 5.16.5 of TS 23.501 [2]. |
| | MCX priority | Indicates the user is subscribed to MCX as indicated in clause 5.16.6 of TS 23.501 [2]. |
| | AMF-Associated Expected UE Behaviour parameters | Information on expected UE movement and communication characteristics. See clause 4.15.6.3 |
| | Steering of Roaming | List of preferred PLMN/access technology combinations and/or Credentials Holder controlled prioritized lists of preferred SNPNs and GINs or HPLMN/Credentials Holder indication that no change of the above list(s) stored in the UE is needed (see NOTE 3). Optionally includes an indication that the UDM requests an acknowledgement of the reception of this information from the UE. |
| | SoR Update Indicator for Initial Registration | An indication whether the UDM requests the AMF to retrieve SoR information when the UE performs Registration with NAS Registration Type "Initial Registration". |

-continued

| Subscription data type | Field | Description |
|---|---|---|
| | SoR Update Indicator for Emergency Registration | An indication whether the UDM requests the AMF to retrieve SoR information when the UE performs Registration with NAS Registration Type "Emergency Registration". |
| | Network Slicing Subscription Change Indicator | When present, indicates to the serving AMF that the subscription data for network slicing changed and the UE configuration must be updated. |
| | Provide the UE with the full set of subscribed S-NSSAIs | Indicates the AMF to provide the UE with the full set of subscribed S-NSSAIs even if they do not share a common NSSRG. |
| | Tracing Requirements | Trace requirements about a UE (e.g. trace reference, address of the Trace Collection Entity, etc.) is defined in TS 32.421 [39]. This information is only sent to AMF in the HPLMN or one of its equivalent PLMN(s). |
| | Inclusion of NSSAI in RRC Connection Establishment Allowed | When present, it is used to indicate that the UE is allowed to include NSSAI in the RRC connection Establishment in clear text for 3GPP access. |
| | Service Gap Time | Used to set the Service Gap timer for Service Gap Control (see clause 5.31.16 of TS 23.501 [2]). |
| | Subscribed DNN list | List of the subscribed DNNs for the UE (NOTE 1). Used to determine the list of LADN available to the UE as defined in clause 5.6.5 of TS 23.501 [2]. |
| | UDM Update Data | Includes a set of parameters see clause 4.20.1 for parameters possible to deliver) to be delivered from UDM to the UE via NAS signalling as defined in clause 4.20 (NOTE 3). Optionally includes an indication that the UDM requests an acknowledgement of the reception of this information from the UE and an indication for the UE to re-register. |
| | NB-IoT UE priority | Numerical value used by the NG-RAN to prioritise between UEs accessing via NB-IoT. |
| | Enhanced Coverage Restriction | Specifies whether CE mode B is restricted for the UE, or both CE mode A and CE mode B are restricted for the UE, or both CE mode A and CE mode B are not restricted for the UE. |
| | NB-IoT Enhanced Coverage Restriction | Indicates whether Enhanced Coverage for NB-IoT UEs is restricted or not. |
| | IAB-Operation allowed | Indicates that the subscriber is allowed for IAB-operation as specified in clause 5.35.2 of TS 23.501 [2]. |
| | Charging Characteristics | It contains the Charging Characteristics as defined in Annex A of TS 32.256 [71]. This information, when provided, shall override any corresponding predefined information at the AMF. |
| | Extended idle mode DRX cycle length | Indicates a subscribed extended idle mode DRX cycle length value. |
| | PCF Selection Assistance info | list of combination of DNN and S-NSSAI that indicates that the same PCF needs to be selected for AM Policy Control and SM Policy Control (NOTE 10). |
| | AerialUESubscriptionInfo | Aerial UE Subscription Information. It contains an Indication on whether Aerial service for the UE is allowed or not. |
| Slice Selection Subscription data (data needed for Slice Selection as described in clause 4.2.2.3 and in | Subscribed S-NSSAIs | The Network Slices that the UE subscribes to. In roaming case, it indicates the subscribed network slices applicable to the serving PLMN (NOTE 11). |
| | Default S-NSSAIs | The Subscribed S-NSSAIs marked as default S-NSSAI. In the roaming case, |

-continued

| Subscription data type | Field | Description |
|---|---|---|
| clause 4.11.0a.5) | | only those applicable to the Serving PLMN (NOTE 12). |
| | S-NSSAIs subject to Network Slice-Specific Authentication and Authorization | The Subscribed S-NSSAIs marked as subject to NSSAA. |
| | Network Slice Simultaneous Registration Group (NSSRG) Information | Optionally, for each S-NSSAI in the Subscribed S-NSSAIs, the one or more value of Network Slice Simultaneous Registration Group(s) (NOTE 11) associated with the S-NSSAI. |
| SMF Selection Subscription data (data needed for SMF Selection as described in clause 6.3.2 of TS 23.501 [2]) | SUPI | Key |
| | SMF Selection Subscription data contains one or more S-NSSAI level subscription data: | |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | DNN(s) subject to aerial services | List of DNNs that are used for aerial services (e.g. UAS operations or C2, etc.) as described in TS 23.256 [80]. (see NOTE 13). |
| | LBO Roaming Information | Indicates whether LBO roaming is allowed per DNN, or per (S-NSSAI, subscribed DNN). |
| | Interworking with EPS indication list | Indicates whether EPS interworking is supported per (S-NSSAI, subscribed DNN). |
| | Same SMF for Multiple PDU Sessions to the same DNN and S-NSSAI | Indication whether the same SMF for multiple PDU Sessions to the same DNN and S-NSSAI is required. |
| | Invoke NEF indication | When present, indicates, per S-NSSAI and per DNN, that NEF based infrequent small data transfer shall be used for the PDU Session (see NOTE 8). |
| | SMF information for static IP address/prefix | When static IP address/prefix is used, this may be used to indicate the associated SMF information per (S-NSSAI, DNN). |
| UE context in SMF data | SUPI | Key. |
| | PDU Session Id(s) | List of PDU Session Id(s) for the UE. |
| | For emergency PDU Session Id: | |
| | Emergency Information | The SMF + PGW-C FQDN for emergency session used for interworking with EPC. |
| | For each non-emergency PDU Session Id: | |
| | DNN | DNN for the PDU Session. |
| | SMF | Allocated SMF for the PDU Session. Includes SMF IP Address and SMF NF Id. |
| | SMF + PGW-C FQDN | The S5/S8 SMF+PGW-C FQDN used for interworking with EPS (see NOTE 5). |
| | PCF ID | The PCF ID serving the PDU Session/PDN Connection. |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for | GPSI List | List of the GPSI (Generic Public Subscription Identifier) used both inside and outside of the 3GPP system to address a 3GPP subscription. |

-continued

| Subscription data type | Field | Description |
|---|---|---|
| PDU Session Establishment) | Internal Group ID-list | List of the subscribed internal group(s) that the UE belongs to. |
| | Trace Requirements | Trace requirements about a UE (e.g. trace reference, address of the Trace Collection Entity, etc . . .) is defined in TS 32.421 [39]. This information is only sent to a SMF in the HPLMN or one of its equivalent PLMN(s). |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |
| | Aerial service indication | Indicates whether the DNN is used for aerial services (e.g. UAS operations or C2, etc.) as described in TS 23.256 [80]. |
| | Framed Route information | Set of Framed Routes. A Framed Route refers to a range of IPv4 addresses/IPv6 Prefixes to associate with a PDU Session established on this (DNN, S-NSSAI). See NOTE 4. |
| | IP Index information | Information used for selecting how the UE IP address is to be allocated (see clause 5.8.2.2.1 in TS 23.501 [2]). |
| | Allowed PDU Session Types | Indicates the allowed PDU Session Types (IPv4, IPv6, IPv4v6, Ethernet, and Unstructured) for the DNN, S-NSSAI. See NOTE 6. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | It contains Charging Characteristics as defined in Annex A clause A.1 of TS 32.255 [45]. This information, when provided, shall override any corresponding predefined information at the SMF. |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| | PDU Session continuity at inter RAT mobility | Provides for this DDN, S-NSSAI how to handle a PDU Session when UE the moves to or from NB-IoT. Possible values are: maintain the PDU session; disconnect the PDU session with a reactivation request; disconnect PDU session without reactivation request; or to leave it to local VPLMN policy. |
| | NEF Identity for NIDD | When present, indicates, per S-NSSAI and per DNN, the identity of the NEF to anchor Unstructured PDU Session. When not present for the S-NSSAI and DNN, the PDU session terminates in UPF (see NOTE 8). |

-continued

| Subscription data type | Field | Description |
|---|---|---|
| | NIDD information | Information such as External Group Identifier, External Identifier, MSISDN, or AF Identifier used for SMF-NEF Connection. |
| | SMF-Associated Expected UE Behaviour parameters | Parameters on expected characteristics of a PDU Session their corresponding validity times as specified in clause 4.15.6.3. |
| | Suggested number of downlink packets | Parameters on expected PDU session characteristics as specified in clauses 4.15.3.2.3b and 4.15.6.3a. |
| | ATSSS information | Indicates whether MA PDU session establishment is allowed. |
| | Secondary authentication indication | Indicates that whether the Secondary authentication/authorization (as defined in clause 5.6 of TS 23.501 [2]) is required for PDU Session Establishment as specified in clause 4.3.2.3. (see NOTE 14) |
| | DN-AAA server UE IP address allocation indication | Indicates that whether the SMF is required to request the UE IP address from the DN-AAA server (as defined in clause 5.6 of TS 23.501 [2]) for PDU Session Establishment as specified in clause 4.3.2.3. |
| | DN-AAA server addressing information | If at least one of secondary DN-AAA authentication, DN-AAA authorization or DN-AAA UE IP address allocation is required by subscription data, the subscription data may also contain DN-AAA server addressing information. |
| | Edge Configuration Server Address Configuration Information | Consists of one or more FQDN(s) and/or IP Address(es) of Edge Configuration Server(s) as defined in clause 6.5.2 of TS 23.548 [74]. |
| | API based secondary authentication indication | Indicates that whether the API based Secondary authentication/authorization (as defined in clause 5.2.3 of TS 23.256 [80]) is required for PDU Session Establishment as specified in clause 4.3.2.3. (see NOTE 14). |
| | UE authorization for EAS discovery via EASDF | Indicates whether the UE is authorized to use 5GC assisted EAS discovery via EASDF (as defined in TS 23.548 [74]). |
| Identifier translation | SUPI | Corresponding SUPI for input GPSI. |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| | GPSI | Corresponding GPSI for input SUPI and associated application information (e.g. Application Port ID) (NOTE 15). |
| Intersystem continuity Context | (DNN, PGW FQDN) list | For each DNN, indicates the SMF + PGW-C which support interworking with EPC. |
| LCS privacy (data needed by GMLC) | LCS privacy profile data | Provides information for LCS privacy classes and Location Privacy Indication (LPI) as defined in clause 5.4.2 in TS 23.273 [51] |
| LCS mobile origination (data needed by AMF) | LCS Mobile Originated Data | When present, indicates to the serving AMF which LCS mobile originated services are subscribed as defined in clause 7.1 in TS 23.273 [51]. |
| User consent (see TS 23.288 [50]) | User consent for UE data collection | Indicates whether the user has given consent for collecting, distributing, and analysing UE related data. User consent is provided per purpose (e.g. analytics, model training). |
| UE reachability | UE reachability information | Provides, per PLMN, the list of NF IDs or the list of NF sets or the list of NF |

-continued

| Subscription data type | Field | Description |
|---|---|---|
| | | types authorized to request notification for UE's reachability (NOTE 7). |
| V2X Subscription data (see TS 23.287 [73]) | NR V2X Services Authorization | Indicates whether the UE is authorized to use the NR sidelink for V2X services as Vehicle UE, Pedestrian UE, or both. |
| | LTE V2X Services Authorization | Indicates whether the UE is authorized to use the LTE sidelink for V2X services as Vehicle UE, Pedestrian UE, or both. |
| | NR UE-PC5-AMBR | AMBR of UE's NR sidelink (i.e. PC5) communication for V2X services. |
| | LTE UE-PC5-AMBR | AMBR of UE's LTE sidelink (i .e. PC5) communication for V2X services. |
| ProSe Subscription data (see TS 23.304 [77]) | ProSe Service Authorization | Indicates whether the UE is authorized to use ProSe Direct Discovery, ProSe Direct Communication, or both and whether the UE is authorized to use or serve as a ProSe UE-to-Network Relay. |
| | ProSe NR UE-PC5-AMBR | AMBR of UE's NR sidelink (i.e. PC5) communication for ProSe services. |
| MBS Subscription data (see TS 23.247 [78]) | MBS Service Authorization | Indicates whether the UE is authorized to use Multicast MBS service. May also indicate the multicast MBS Session which the UE is allowed to join if the UE is authorized to use multicast MBS Service. |
| AI Subscription Data | AI Service Authorization | Indicates whether the UE is allowed to join an AI group to participate in AI operations performed between the UE and AI AF. |

30

UDR Data Keys:

| Data Set | Data Subset | Data Key | Data Sub Key |
|---|---|---|---|
| Subscription Data (see clause 5.2.3.3.1) | Access and Mobility Subscription data | SUPI | Serving PLMN ID and optionally NID |
| | SMF Selection Subscription data | SUPI | Serving PLMN ID and optionally NID |
| | UE context in SMF data | SUPI | PDU Session ID or DNN |
| | SMS Management Subscription data | SUPI | Serving PLMN ID and optionally NID |
| | SMS Subscription data | SUPI | Serving PLMN ID and optionally NID |
| | Session Management Subscription data | SUPI | S-NSSAI DNN Serving PLMN ID and optionally NID |
| | Slice Selection Subscription data | SUPI | Serving PLMN ID and optionally NID |
| | Group Data | Internal Group Identifier or External Group Identifier | — |
| | Identifier translation | GPSI SUPI | Application Port ID, MTC Provider Information, AF Identifier |

| Data Set | Data Subset | Data Key | Data Sub Key |
|---|---|---|---|
| | Intersystem continuity Context | SUPI | DNN |
| | LCS privacy | SUPI | — |
| | LCS mobile origination | SUPI | — |
| | UE reachability | SUPI | — |
| | Group Identifier Translation | Internal Group Identifier or External Group Identifier | — |
| | UE context in SMSF data | SUPI | — |
| | V2X Subscription data | SUPI | — |
| | ProSe Subscription data | SUPI | — |
| | User consent | SUPI | Purpose |
| | ECS Address Configuration Information (See Table 4.15.6.3d-l) | SUPI, Internal group identifier or external group identifier or any UE | DNN, S-NSSAI |
| | MBS Subscription data | SUPI | — |
| Application data | Packet Flow Descriptions (PFDs) | Application Identifier | — |
| | AF traffic influence request information (See clause 5.6.7 and clause 6.3.7.2 of TS 23.501 [2]) | AF transaction internal ID S-NSSAI and DNN and/or Internal Group Identifier or SUPI | |
| | Background Data Transfer (NOTE 3) | Internal Group Identifier or SUPI | |
| | Service specific information (See clause 4.15.6.7) | S-NSSAI and DNN or Internal Group Identifier or SUPI | |
| | EAS Deployment Information (See clause 7.1 of TS 23.548 [74]) | DNN and/or S-NSSAI | Application Identifier and/or Internal Group Identifier |
| | AM policy influence request information (See clause 4.15.6.9.3) | AF transaction internal ID S-NSSAI and DNN and/or Internal Group Identifier or SUPI | |
| | Time-Sync data (See clauses 4.15.9.2, 4.15.9.3 and 4.15.9.4) | DNN and S-NSSAI Internal Group Identifier SUPI | |
| | AI service specific information | S-NSSAI, DNN, AI AF identifier | |
| Policy Data | UE context policy control data (See clause 6.2.1.3 of TS 23.503 [20]) | SUPI | |
| | PDU Session policy control data (See clause 6.2.1.3 of TS 23.503 [20]) | SUPI | S-NSSAI DNN |
| | Policy Set Entry data (See clause 6.2.1.3 of TS 23.503 [20]) | SUPI (for the UDR in HPLMN) PLMN ID (for the UDR in VPLMN) | |
| | Remaining allowed Usage data (See clause 6.2.1.3 of TS 23.503 [20]) | SUPI | S-NSSAI DNN |
| | Sponsored data connectivity profiles (See clause 6.2.1.6 of TS 23.503 [20]) | Sponsor Identity | |
| | Background Data Transfer data (See clause 6.2.1.6 of TS 23.503 [20]) | Background Data Transfer Reference ID. (NOTE 2) None. (NOTE 1) | |

-continued

| Data Set | Data Subset | Data Key | Data Sub Key |
|---|---|---|---|
| | Network Slice Specific Control Data (See clause 6.2.1.3 of TS 23.503 [20]) | S-NSSAI | |
| Exposure Data (see clause 5.2.12.1) | Access and Mobility Information | SUPI or GPSI | PDU Session ID or UE |
| | Session Management information | SUPI or GPSI | IP address or DNN |

Example PCC Rules in 5GC:

| Information name | Description | Category | PCF permitted to modify for a dynamic PCC rule in the SMF | Differences compared with table 6.3. in TS 23.203 [4] |
|---|---|---|---|---|
| Rule identifier | Uniquely identifies the PCC rule, within a PDU Session. It is used between PCF and SMF for referencing PCC rules. | Mandatory | No | None |
| Service data flow detection | This part defines the method for detecting packets belonging to a service data flow. | | | |
| Precedence | Determines the order, in which the service data flow templates are applied at service data flow detection, enforcement and charging. (NOTE 1). | Conditional (NOTE 2) | Yes | None |
| Service data flow template | For IP PDU traffic: Either a list of service data flow filters or an application identifier that references the corresponding application detection filter for the detection of the service data flow. For Ethernet PDU traffic: Combination of traffic patterns of the Ethernet PDU traffic. It is defined in clause 5.7.6.3 of TS 23.501 [2]. | Mandatory (NOTE 3) | Conditional (NOTE 4) | Modified (packet filters for Ethernet PDU traffic added) |
| Mute for notification | Defines whether application's start or stop notification is to be muted. | Conditional (NOTE 5) | No | None |
| Charging | This part defines identities and instructions for charging and accounting that is required for an access point where flow based charging is configured | | | |
| Charging key (NOTE 22) | The charging system (CHF) uses the charging key to determine the tariff to apply to the service data flow. | | Yes | None |
| Service identifier | The identity of the service or service component the service data flow in a rule relates to. | | Yes | None |
| Sponsor Identifier | An identifier, provided from the AF which identifies the Sponsor, used for sponsored flows to correlate measurements from different users for accounting purposes. | Conditional (NOTE 6) | Yes | None |
| Application Service Provider Identifier | An identifier, provided from the AF which identifies the Application Service Provider, used for sponsored flows to correlate measurements from different users for accounting purposes. | Conditional (NOTE 6) | Yes | None |
| Charging method | Indicates the required charging method for the PCC rule. Values: online or offline or neither. | Conditional (NOTE 7) | No | None |

-continued

| Information name | Description | Category | PCF permitted to modify for a dynamic PCC rule in the SMF | Differences compared with table 6.3. in TS 23.203 [4] |
|---|---|---|---|---|
| Service Data flow handling while requesting credit | Indicates whether the service data flow is allowed to start while the SMF is waiting for the response to the credit request. Only applicable for charging method online. Values: blocking or non-blocking | | No | New |
| Measurement method | Indicates whether the service data flow data volume, duration, combined volume/duration or event shall be measured. This is applicable to reporting, if the charging method is online or offline. Note: Event based charging is only applicable to predefined PCC rules and PCC rules used for application detection filter (i.e. with an application identifier). | | Yes | None |
| Application Function Record Information | An identifier, provided from the AF, correlating the measurement for the Charging key/Service identifier values in this PCC rule with application level reports. | | No | None |
| Service Identifier Level Reporting | Indicates that separate usage reports shall be generated for this Service Identifier. Values: mandated or not required | | Yes | None |
| Policy control | This part defines how to apply policy control for the service data flow. | | | |
| Gate status | The gate status indicates whether the service data flow, detected by the service data flow template, may pass (Gate is open) or shall be discarded (Gate is closed). | | Yes | None |
| 5G QoS Identifier (5QI) | The 5QI authorized for the service data flow. | Conditional (NOTE 10) | Yes | Modified (corresponds to QCI in TS 23.203 [4]) |
| QoS Notification Control (QNC) | Indicates whether notifications are requested from 3GPP RAN when the GFBR can no longer (or can again) be guaranteed for a QoS Flow during the lifetime of the QoS Flow. | Conditional (NOTE 15) | Yes | Added |
| Reflective QoS Control | Indicates to apply reflective QoS for the SDF. | | Yes | Added |
| UL-maximum bitrate | The uplink maximum bitrate authorized for the service data flow | | Yes | None |
| DL-maximum bitrate | The downlink maximum bitrate authorized for the service data flow | | Yes | None |
| UL-guaranteed bitrate | The uplink guaranteed bitrate authorized for the service data flow | | Yes | None |
| DL-guaranteed bitrate | The downlink guaranteed bitrate authorized for the service data flow | | Yes | None |
| UL sharing indication | Indicates resource sharing in uplink direction with service data flows having the same value in their PCC rule | | No | None |

| Information name | Description | Category | PCF permitted to modify for a dynamic PCC rule in the SMF | Differences compared with table 6.3. in TS 23.203 [4] |
|---|---|---|---|---|
| DL sharing indication | Indicates resource sharing in downlink direction with service data flows having the same value in their PCC rule | | No | None |
| Redirect | Redirect state of the service data flow (enabled/disabled) | Conditional (NOTE 8) | Yes | None |
| Redirect Destination | Controlled Address to which the service data flow is redirected when redirect is enabled | Conditional (NOTE 9) | Yes | None |
| ARP | The Allocation and Retention Priority for the service data flow consisting of the priority level, the pre-emption capability and the pre-emption vulnerability | Conditional (NOTE 10) | Yes | None |
| Bind to QoS Flow associated with the default QoS rule | Indicates that the dynamic PCC rule shall always have its binding with the QoS Flow associated with the default QoS rule (NOTE 11). | | Yes | Modified (corresponds to bind to the default bearer in TS 23.203 [4]) |
| Bind to QoS Flow associated with the default QoS rule and apply PCC rule parameters | Indicates that the dynamic PCC rule shall always have its binding with the QoS Flow associated with the default QoS rule. It also indicates that the that the QoS related attributes of the PCC rule shall be applied to derive the QoS parameters of the QoS Flow associated with the default QoS rule instead of the PDU Session related parameters Authorized default 5QI/ARP. | Conditional (NOTE 17) | Yes | Added |
| PS to CS session continuity | Indicates whether the service data flow is a candidate for vSRVCC. | | | Removed |
| Priority Level | Indicates a priority in scheduling resources among QoS Flows (NOTE 14). | | Yes | Added |
| Averaging Window | Represents the duration over which the guaranteed and maximum bitrate shall be calculated (NOTE 14). | | Yes | Added |
| Maximum Data Burst Volume | Denotes the largest amount of data that is required to be transferred within a period of 5G-AN PDB (NOTE 14). | | Yes | Added |
| Disable UE notifications at changes related to Alternative QoS Profiles | Indicates to disable QoS Flow parameters signalling to the UE when the SMF is notified by the NG-RAN of changes in the fulfilled QoS situation. The fulfilled situation is either the QoS profile or an Alternative QoS Profile. | Conditional (NOTE 25) | Yes | Added |
| Access Network Information Reporting | This part describes access network information to be reported for the PCC rule when the corresponding QoS Flow is established, modified or terminated. | | | |
| User Location Report | The serving cell of the UE is to be reported. When the corresponding QoS Flow is deactivated, and if available, information on when the UE was last known to be in that location is also to be reported. | | Yes | None |
| UE Timezone Report | The time zone of the UE is to be reported. | | Yes | None |
| Usage | This part describes identities | | | None |

-continued

| Information name | Description | Category | PCF permitted to modify for a dynamic PCC rule in the SMF | Differences compared with table 6.3. in TS 23.203 [4] |
|---|---|---|---|---|
| Monitoring Control | required for Usage Monitoring Control. | | | |
| Monitoring key (NOTE 23) | The PCF uses the monitoring key to group services that share a common allowed usage. | | Yes | None |
| Indication of exclusion from session level monitoring | Indicates that the service data flow shall be excluded from PDU Session usage monitoring | | Yes | None |
| N6-LAN Traffic Steering Enforcement Control (NOTE 18) | This part describes information required for N6-LAN Traffic Steering. | | | |
| Traffic steering policy identifier(s) | Reference to a pre-configured traffic steering policy at the SMF (NOTE 12). | | Yes | None |
| AF influenced Traffic Steering Enforcement Control (NOTE 18) | This part describes information required for AF influenced Traffic Steering. | | | |
| Data Network Access Identifier | Identifier(s) of the target Data Network Access (DNAI). It is defined in clause 5.6.7 of TS 23.501 [2]. | | Yes | Added |
| Per DNAI: Traffic steering policy identifier | Reference to a pre-configured traffic steering policy at the SMF (NOTE 19). | | Yes | Added |
| Per DNAI: N6 traffic routing information | Describes the information necessary for traffic steering to the DNAI. It is described in clause 5.6.7 of TS 23.501 [2] (NOTE 19). | | Yes | Added |
| Information on AF subscription to UP change events | Indicates whether notifications in the case of change of UP path are requested and optionally indicates whether acknowledgment to the notifications shall be expected (as defined in clause 5.6.7 of TS 23.501 [2]). | | Yes | Added |
| Indication of UE IP address preservation | Indicates UE IP address should be preserved. It is defined in clause 5.6.7 of TS 23.501 [2]. | | Yes | Added |
| Indication of traffic correlation | Indicates that the target PDU Sessions should be correlated via a common DNAI in the user plane. It is described in clause 5.6.7 of TS 23.501 [2]. | | Yes | Added |
| Information on User Plane Latency requirements | Indicates the user plane latency requirements. It is defined in clause 6.3.6 of TS 23.548 [33]. | | Yes | Added |
| Indication for Simultaneous Connectivity at Edge Relocation | Indicates request for simultaneous connectivity over source and target PSA from the AF (see clause 5.6.7 of TS 23.501 [2]). | | Yes | Added |
| Information for EAS IP Replacement in 5GC | Indicates the Source EAS identifier and Target EAS identifier, (i.e. IP addresses and port numbers of the source and target EAS). (see clause 5.6.7 of TS 23.501 [2]). | | Yes | Added |
| NBIFOM related | This part describes PCC rule information related with | | | |

-continued

| Information name | Description | Category | PCF permitted to modify for a dynamic PCC rule in the SMF | Differences compared with table 6.3. in TS 23.203 [4] |
|---|---|---|---|---|
| control Information | NBIFOM. | | | |
| Allowed Access Type | The access to be used for traffic identified by the PCC rule. | | | Removed |
| RAN support information | This part defines information supporting the RAN for e.g. handover threshold decision. | | | |
| UL Maximum Packet Loss Rate | The maximum rate for lost packets that can be tolerated in the uplink direction for the service data flow. It is defined in clause 5.7.2.8 of TS 23.501 [2]. | Conditional (NOTE 13) | Yes | None |
| DL Maximum Packet Loss Rate | The maximum rate for lost packets that can be tolerated in the downlink direction for the service data flow. It is defined in clause 5.7.2.8 of TS 23.501 [2]. | Conditional (NOTE 13) | Yes | None |
| MA PDU Session Control (NOTE 20) | This part defines information supporting control of MA PDU Sessions | | Yes | New |
| Application descriptors | Identifies the application traffic for which MA PDU Session control is required based on the Steering Functionality, the Steering Mode, Steering Mode Indicator and Threshold Values. It is described in clause 5.32.8 of TS 23.501 [2]. | Conditional (NOTE 27) | Yes | New |
| Steering Functionality | Indicates the applicable traffic steering functionality. | Conditional (NOTE 21) | Yes | New |
| Steering Mode | Indicates the rule for distributing traffic between accesses together with associated steering parameters (if any). | Conditional (NOTE 21) | Yes | New |
| Steering Mode Indicator | Indicates either autonomous load-balance operation or UE-assistance operation, if the Steering Mode is set to "Load Balancing", as defined in TS 23.501 [2]. | | Yes | New |
| Threshold Values | A Maximum RTT or a Maximum Packet Loss Rate or both. | | Yes | New |
| Charging key for Non-3GPP access (NOTE 22) | Indicates the Charging key used for charging packets carried via Non-3GPP access for a MA PDU Session. | | Yes | New |
| Monitoring key for Non-3GPP access (NOTE 23) | Indicates the Monitoring key used to monitor usage of the packets carried via Non-3GPP access for a MA PDU Session. | | Yes | New |
| QoS Monitoring for URLLC | This part describes PCC rule information related with QoS Monitoring for URLLC. | | | |
| QoS parameter(s) to be measured | UL packet delay, DL packet delay or round trip packet delay. | | Yes | Added |
| Reporting frequency | Defines the frequency for the reporting, such as event triggered, periodic, when no packet delay measurement result is received for a delay exceeding a threshold, or when the PDU Session is released. | | Yes | Added |
| Target of reporting | Defines the target of the QoS Monitoring reports, it can be the PCF or the AF or the Local NEF, decided by the PCF. | | Yes | Added |

-continued

| Information name | Description | Category | PCF permitted to modify for a dynamic PCC rule in the SMF | Differences compared with table 6.3. in TS 23.203 [4] |
|---|---|---|---|---|
| Indication of direct event notification | Indicates that the QoS Monitoring event shall be reported by the UPF directly to the NF indicated by the Target of reporting. | | Yes | Added |
| Alternative QoS Parameter Sets (NOTE 24) (NOTE 26) | This part defines Alternative QoS Parameter Sets for the service data flow. | | | |
| Packet Delay Budget | The Packet Delay Budget in this Alternative QoS Parameter Set. | | Yes | Added |
| Packet Error Rate | The Packet Error Rate in this Alternative QoS Parameter Set. | | Yes | Added |
| UL-guaranteed bitrate | The uplink guaranteed bitrate in this Alternative QoS Parameter Set. | | Yes | Added |
| DL-guaranteed bitrate | The downlink guaranteed bitrate in this Alternative QoS Parameter Set. | | Yes | Added |
| TSC Assistance Container | This part defines parameters provided by TSN AF or TSCTSF. The parameters are defined in clause 5.27.2 of TS 23.501 [2]. | | No | Added |
| AIML Session Indicator | This part defines parameters provided by AI AF | Conditional (Only applicable for AI AF sessions) | | Added |
| Downlink Data Notification Control | This part describes information required for controlling the sending of Downlink data delivery status event and DDN Failure event notifications as specified in clause 4.15.3 of TS 23.502 [3]. | | | |
| Notification control for DDD status | Indicates that notifications of downlink data delivery status are required and the requested type of such notifications. | | Yes | Added |
| Notification Control for DDN Failure | Indicates that notifications of DDN Failure are required. | | Yes | Added |

Example AIF Services:

The following Table illustrates example AIF services and service operations:

| NF service | Service Operations | Operation Semantics | Example Consumer(s) |
|---|---|---|---|
| Naif_AFSession | Create | Request/Response | NEF, AF |

Systems and Implementations

FIGS. 5-9 illustrate various systems, devices, and components that may implement aspects of disclosed embodiments.

Figure 5:
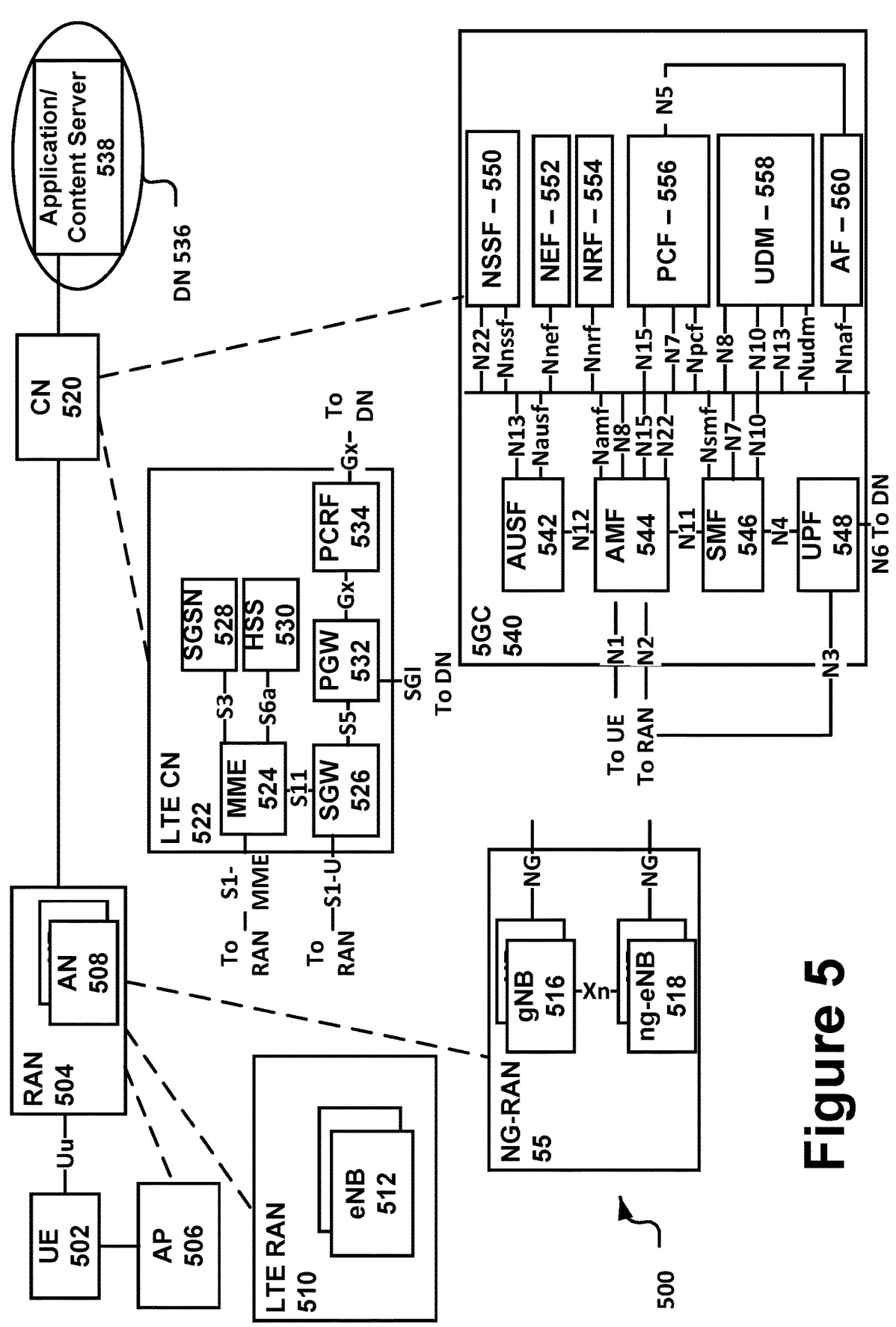
FIG. 5 schematically illustrates a wireless network in accordance with various embodiments.

FIG. 5 illustrates a network 500 in accordance with various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 may include a UE 502, which may include any mobile or non-mobile computing device designed to communicate with a RAN 504 via an over-the-air connection. The UE 502 may be communicatively coupled with the RAN 504 by a Uu interface. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 502 may additionally communicate with an AP 506 via an over-the-air connection. The AP 506 may manage a WLAN connection, which may serve to offload some/all network traffic from the RAN 504. The connection between the UE 502 and the AP 506 may be consistent with any IEEE 802.11 protocol, wherein the AP 506 could be a wireless fidelity (Wi-Fi®) router. In some embodiments, the UE 502, RAN 504, and AP 506 may utilize cellular-WLAN aggregation (for example, LWA/LWIP). Cellular-WLAN aggregation may involve the UE 502 being configured by the RAN 504 to utilize both cellular radio resources and WLAN resources.

The RAN 504 may include one or more access nodes, for example, AN 508. AN 508 may terminate air-interface protocols for the UE 502 by providing access stratum protocols including RRC, PDCP, RLC, MAC, and L1 protocols. In this manner, the AN 508 may enable data/voice connectivity between CN 520 and the UE 502. In some embodiments, the AN 508 may be implemented in a discrete device or as one or more software entities running on server computers as part of, for example, a virtual network, which may be referred to as a CRAN or virtual baseband unit pool. The AN 508 be referred to as a BS, gNB, RAN node, eNB, ng-eNB, NodeB, RSU, TRxP, TRP, etc. The AN 508 may be a macrocell base station or a low power base station for providing femtocells, picocells or other like cells having smaller coverage areas, smaller user capacity, or higher bandwidth compared to macrocells.

In embodiments in which the RAN 504 includes a plurality of ANs, they may be coupled with one another via an X2 interface (if the RAN 504 is an LTE RAN) or an Xn interface (if the RAN 504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs of the RAN 504. For example, the UE 502 and RAN 504 may use carrier aggregation to allow the UE 502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an LTE RAN 510 with eNBs, for example, eNB 512. The LTE RAN 510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 504 may be an NG-RAN 514 with gNBs, for example, gNB 516, or ng-eNBs, for example, ng-eNB 518. The gNB 516 may connect with 5G-enabled UEs using a 5G NR interface. The gNB 516 may connect with a 5G core through an NG interface, which may include an N2 interface or an N3 interface. The ng-eNB 518 may also connect with the 5G core through an NG interface, but may connect with a UE via an LTE air interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN514 and an AMF 544 (e.g., N2 interface).

The NG-RAN 514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (for example, PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements to provide various functions to support data and telecommunications services to customers/subscribers (for example, users of UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

In some embodiments, the CN 520 may be an LTE CN 522, which may also be referred to as an EPC. The LTE CN 522 may include MME 524, SGW 526, SGSN 528, HSS 530, PGW 532, and PCRF 534 coupled with one another over interfaces (or "reference points") as shown. Functions of the elements of the LTE CN 522 may be briefly introduced as follows.

The MME 524 may implement mobility management functions to track a current location of the UE 502 to facilitate paging, bearer activation/deactivation, handovers, gateway selection, authentication, etc.

The SGW 526 may terminate an S1 interface toward the RAN and route data packets between the RAN and the LTE CN 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 may track a location of the UE 502 and perform security functions and access control. In addition, the SGSN 528 may perform inter-EPC node signaling for mobility between different RAT networks; PDN and S-GW selection as specified by MME 524; MME selection for handovers; etc. The S3 reference point between the MME 524 and the SGSN 528 may enable user and bearer information exchange for inter-3GPP access network mobility in idle/active states.

The HSS 530 may include a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the LTE CN 520.

The PGW 532 may terminate an SGi interface toward a data network (DN) 536 that may include an application/content server 538. The PGW 532 may route data packets between the LTE CN 522 and the data network 536. The PGW 532 may be coupled with the SGW 526 by an S5 reference point to facilitate user plane tunneling and tunnel management. The PGW 532 may further include a node for policy enforcement and charging data collection (for example, PCEF). Additionally, the SGi reference point between the PGW 532 and the data network 5 36 may be an operator external public, a private PDN, or an intra-operator packet data network, for example, for provision of IMS services. The PGW 532 may be coupled with a PCRF 534 via a Gx reference point.

The PCRF 534 is the policy and charging control element of the LTE CN 522. The PCRF 534 may be communicatively coupled to the app/content server 538 to determine appropriate QoS and charging parameters for service flows. The PCRF 532 may provision associated rules into a PCEF (via Gx reference point) with appropriate TFT and QCI.

In some embodiments, the CN 520 may be a 5GC 540. The 5GC 540 may include an AUSF 542, AMF 544, SMF 546, UPF 548, NSSF 550, NEF 552, NRF 554, PCF 556, UDM 558, and AF 560 coupled with one another over interfaces (or "reference points") as shown. Functions of the elements of the 5GC 540 may be briefly introduced as follows.

The AUSF 542 may store data for authentication of UE 502 and handle authentication-related functionality. The AUSF 542 may facilitate a common authentication framework for various access types. In addition to communicating with other elements of the 5GC 540 over reference points as shown, the AUSF 542 may exhibit an Nausf service-based interface.

The AMF 544 may allow other functions of the 5GC 540 to communicate with the UE 502 and the RAN 504 and to subscribe to notifications about mobility events with respect to the UE 502. The AMF 544 may be responsible for registration management (for example, for registering UE 502), connection management, reachability management, mobility management, lawful interception of AMF-related events, and access authentication and authorization. The AMF 544 may provide transport for SM messages between the UE 502 and the SMF 546, and act as a transparent proxy for routing SM messages. AMF 544 may also provide transport for SMS messages between UE 502 and an SMSF. AMF 544 may interact with the AUSF 542 and the UE 502 to perform various security anchor and context management functions. Furthermore, AMF 544 may be a termination point of a RAN CP interface, which may include or be an N2 reference point between the RAN 504 and the AMF 544; and the AMF 544 may be a termination point of NAS (N1) signaling, and perform NAS ciphering and integrity protection. AMF 544 may also support NAS signaling with the UE 502 over an N3 IWF interface.

The SMF 546 may be responsible for SM (for example, session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to AN 508; and determining SSC mode of a session. SM may refer to management of a PDU session, and a PDU session or "session" may refer to a PDU connectivity service that provides or enables the exchange of PDUs between the UE 502 and the data network 536.

The UPF 548 may act as an anchor point for intra-RAT and inter-RAT mobility, an external PDU session point of interconnect to data network 536, and a branching point to support multi-homed PDU session. The UPF 548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 548 may include an uplink classifier to support routing traffic flows to a data network.

The NSSF 550 may select a set of network slice instances serving the UE 502. The NSSF 550 may also determine allowed NSSAI and the mapping to the subscribed S-NS-SAIs, if needed. The NSSF 550 may also determine the AMF set to be used to serve the UE 502, or a list of candidate AMFs based on a suitable configuration and possibly by querying the NRF 554. The selection of a set of network slice instances for the UE 502 may be triggered by the AMF 544 with which the UE 502 is registered by interacting with the NSSF 550, which may lead to a change of AMF. The NSSF 550 may interact with the AMF 544 via an N22 reference point; and may communicate with another NSSF in a visited network via an N31 reference point (not shown). Additionally, the NSSF 550 may exhibit an Nnssf service-based interface.

The NEF 552 may securely expose services and capabilities provided by 3GPP network functions for third party, internal exposure/re-exposure, AFs (e.g., AF 560), edge computing or fog computing systems, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics. Additionally, the NEF 552 may exhibit an Nnef service-based interface.

The NRF 554 may support service discovery functions, receive NF discovery requests from NF instances, and provide the information of the discovered NF instances to the NF instances. NRF 554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 554 may exhibit the Nnrf service-based interface.

The PCF 556 may provide policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 may handle subscription-related information to support the network entities' handling of communication sessions, and may store subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

The AF 560 may provide application influence on traffic routing, provide access to NEF, and interact with the policy framework for policy control.

In some embodiments, the 5GC 540 may enable edge computing by selecting operator/3rd party services to be geographically close to a point that the UE 502 is attached to the network. This may reduce latency and load on the network. To provide edge-computing implementations, the 5GC 540 may select a UPF 548 close to the UE 502 and execute traffic steering from the UPF 548 to data network 536 via the N6 interface. This may be based on the UE subscription data, UE location, and information provided by the AF 560. In this way, the AF 560 may influence UPF (re)selection and traffic routing. Based on operator deployment, when AF 560 is considered to be a trusted entity, the network operator may permit AF 560 to interact directly with relevant NFs. Additionally, the AF 560 may exhibit an Naf service-based interface.

The data network 536 may represent various network operator services, Internet access, or third party services that may be provided by one or more servers including, for example, application/content server 538.

Figure 6:
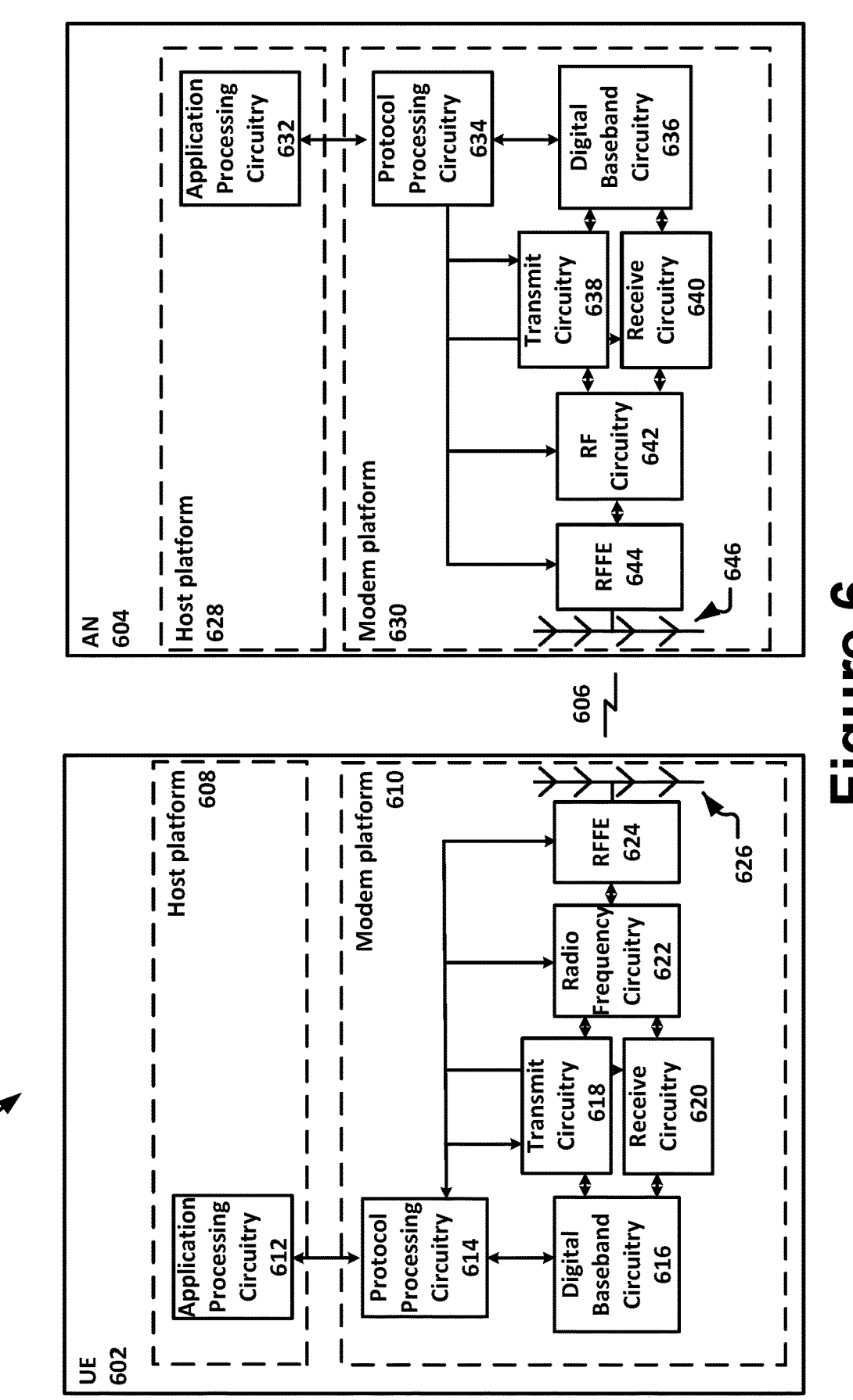
FIG. 6 schematically illustrates components of a wireless network in accordance with various embodiments.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described elsewhere herein.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mmWave or sub-6 GHz frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

Figure 7:
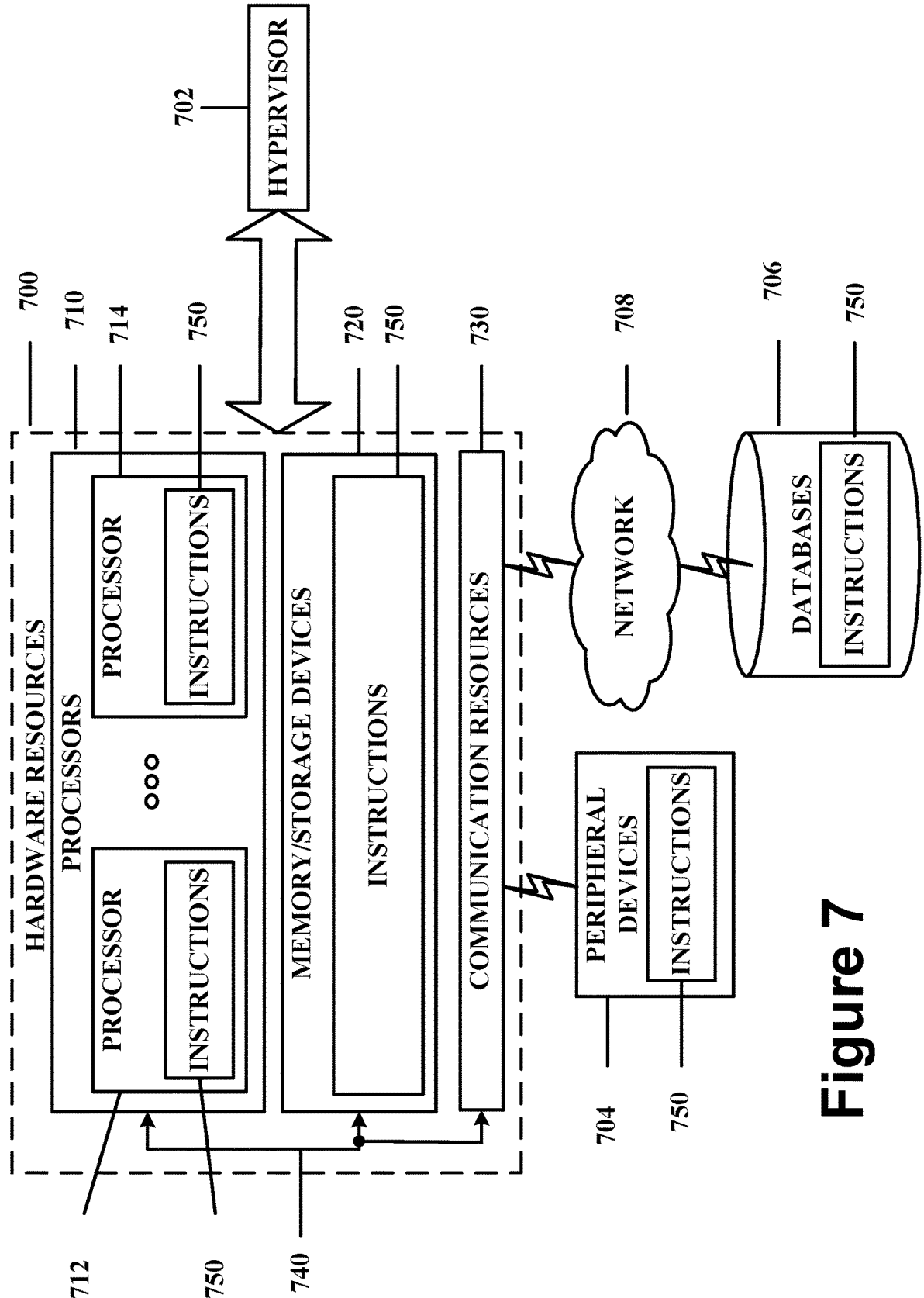
FIG. 7 is a block diagram illustrating components, according to some example embodiments, able to read instructions from a machine-readable or computer-readable medium (e.g., a non-transitory machine-readable storage medium) and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/subslices to utilize the hardware resources 700.

The processors 710 may include, for example, a processor 712 and a processor 714. The processors 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, etc.), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
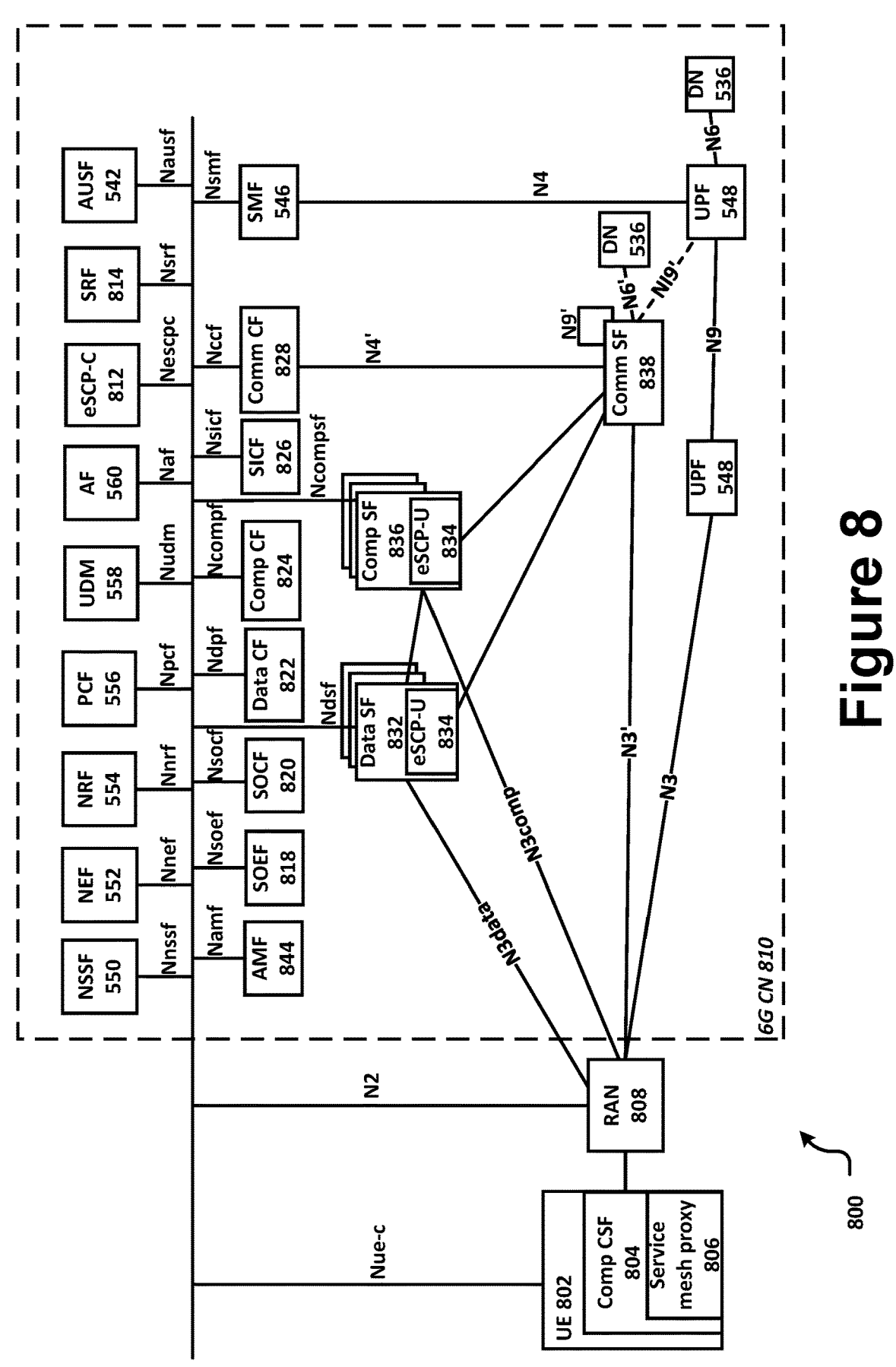
FIG. 8 illustrates a network in accordance with various embodiments.

FIG. 8 illustrates a network 800 in accordance with various embodiments. The network 800 may operate in a matter consistent with 3GPP technical specifications or technical reports for 6G systems. In some embodiments, the network 800 may operate concurrently with network 500. For example, in some embodiments, the network 800 may share one or more frequency or bandwidth resources with network 500. As one specific example, a UE (e.g., UE 802) may be configured to operate in both network 800 and network 500. Such configuration may be based on a UE including circuitry configured for communication with frequency and bandwidth resources of both networks 500 and 800. In general, several elements of network 800 may share one or more characteristics with elements of network 500. For the sake of brevity and clarity, such elements may not be repeated in the description of network 800.

The network 800 may include a UE 802, which may include any mobile or non-mobile computing device designed to communicate with a RAN 808 via an over-the-air connection. The UE 802 may be similar to, for example, UE 502. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 8, in some embodiments the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 8, the UE 802 may be communicatively coupled with an AP such as AP 506 as described with respect to FIG. 5. Additionally, although not specifically shown in FIG. 8, in some embodiments the RAN 808 may include one or more ANss such as AN 508 as described with respect to FIG. 5. The RAN 808 and/or the AN of the RAN 808 may be referred to as a base station (BS), a RAN node, or using some other term or name.

The UE 802 and the RAN 808 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 808 may allow for communication between the UE 802 and a 6G core network (CN) 810. Specifically, the RAN 808 may facilitate the transmission and reception of data between the UE 802 and the 6G CN 810. The 6G CN 810 may include various functions such as NSSF 550, NEF 552, NRF 554, PCF 556, UDM 558, AF 560, SMF 546, and AUSF 542. The 6G CN 810 may additional include UPF 548 and DN 536 as shown in FIG. 8.

Additionally, the RAN 808 may include various additional functions that are in addition to, or alternative to, functions of a legacy cellular network such as a 4G or 5G network. Two such functions may include a Compute Control Function (Comp CF) 824 and a Compute Service Function (Comp SF) 836. The Comp CF 824 and the Comp SF 836 may be parts or functions of the Computing Service Plane. Comp CF 824 may be a control plane function that provides functionalities such as management of the Comp SF 836, computing task context generation and management (e.g., create, read, modify, delete), interaction with the underlying computing infrastructure for computing resource management, etc. Comp SF 836 may be a user plane function that serves as the gateway to interface computing service users (such as UE 802) and computing nodes behind a Comp SF instance. Some functionalities of the Comp SF 836 may include: parse computing service data received from users to compute tasks executable by computing nodes; hold service mesh ingress gateway or service API gateway; service and charging policies enforcement; performance monitoring and telemetry collection, etc. In some embodiments, a Comp SF 836 instance may serve as the user plane gateway for a cluster of computing nodes. A Comp CF 824 instance may control one or more Comp SF 836 instances.

Two other such functions may include a Communication Control Function (Comm CF) 828 and a Communication Service Function (Comm SF) 838, which may be parts of the Communication Service Plane. The Comm CF 828 may be the control plane function for managing the Comm SF 838, communication sessions creation/configuration/releasing, and managing communication session context. The Comm SF 838 may be a user plane function for data transport. Comm CF 828 and Comm SF 838 may be considered as upgrades of SMF 546 and UPF 548, which were described with respect to a 5G system in FIG. 5. The upgrades provided by the Comm CF 828 and the Comm SF 838 may enable service-aware transport. For legacy (e.g., 4G or 5G) data transport, SMF 546 and UPF 548 may still be used.

Two other such functions may include a Data Control Function (Data CF) 822 and Data Service Function (Data SF) 832 may be parts of the Data Service Plane. Data CF 822 may be a control plane function and provides functionalities such as Data SF 832 management, Data service creation/configuration/releasing, Data service context management, etc. Data SF 832 may be a user plane function and serve as the gateway between data service users (such as UE 802 and the various functions of the 6G CN 810) and data service endpoints behind the gateway. Specific functionalities may include: parse data service user data and forward to corresponding data service endpoints, generate charging data, report data service status.

Another such function may be the Service Orchestration and Chaining Function (SOCF) 820, which may discover, orchestrate and chain up communication/computing/data services provided by functions in the network. Upon receiving service requests from users, SOCF 820 may interact with one or more of Comp CF 824, Comm CF 828, and Data CF 822 to identify Comp SF 836, Comm SF 838, and Data SF 832 instances, configure service resources, and generate the service chain, which could contain multiple Comp SF 836, Comm SF 838, and Data SF 832 instances and their associated computing endpoints. Workload processing and data movement may then be conducted within the generated service chain. The SOCF 820 may also responsible for maintaining, updating, and releasing a created service chain.

Another such function may be the service registration function (SRF) 814, which may act as a registry for system services provided in the user plane such as services provided by service endpoints behind Comp SF 836 and Data SF 832 gateways and services provided by the UE 802. The SRF 814 may be considered a counterpart of NRF 554, which may act as the registry for network functions.

Other such functions may include an evolved service communication proxy (eSCP) and service infrastructure control function (SICF) 826, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 812 and eSCP-U 834, for control plane service communication proxy and user plane service communication proxy, respectively. The SICF 826 may control and configure eCSP instances in terms of service traffic routing policies, access rules, load balancing configurations, performance monitoring, etc.

Another such function is the AMF 844. The AMF 844 may be similar to 544, but with additional functionality. Specifically, the AMF 844 may include potential functional repartition, such as move the message forwarding functionality from the AMF 844 to the RAN 808.

Another such function is the service orchestration exposure function (SOEF) 818. The SOEF may be configured to expose service orchestration and chaining services to external users such as applications.

The UE 802 may include an additional function that is referred to as a computing client service function (comp CSF) 804. The comp CSF 804 may have both the control plane functionalities and user plane functionalities, and may interact with corresponding network side functions such as SOCF 820, Comp CF 824, Comp SF 836, Data CF 822, and/or Data SF 832 for service discovery, request/response, compute task workload exchange, etc. The Comp CSF 804 may also work with network side functions to decide on whether a computing task should be run on the UE 802, the RAN 808, and/or an element of the 6G CN 810.

The UE 802 and/or the Comp CSF 804 may include a service mesh proxy 806. The service mesh proxy 806 may act as a proxy for service-to-service communication in the user plane. Capabilities of the service mesh proxy 806 may include one or more of addressing, security, load balancing, etc.

Figure 9:
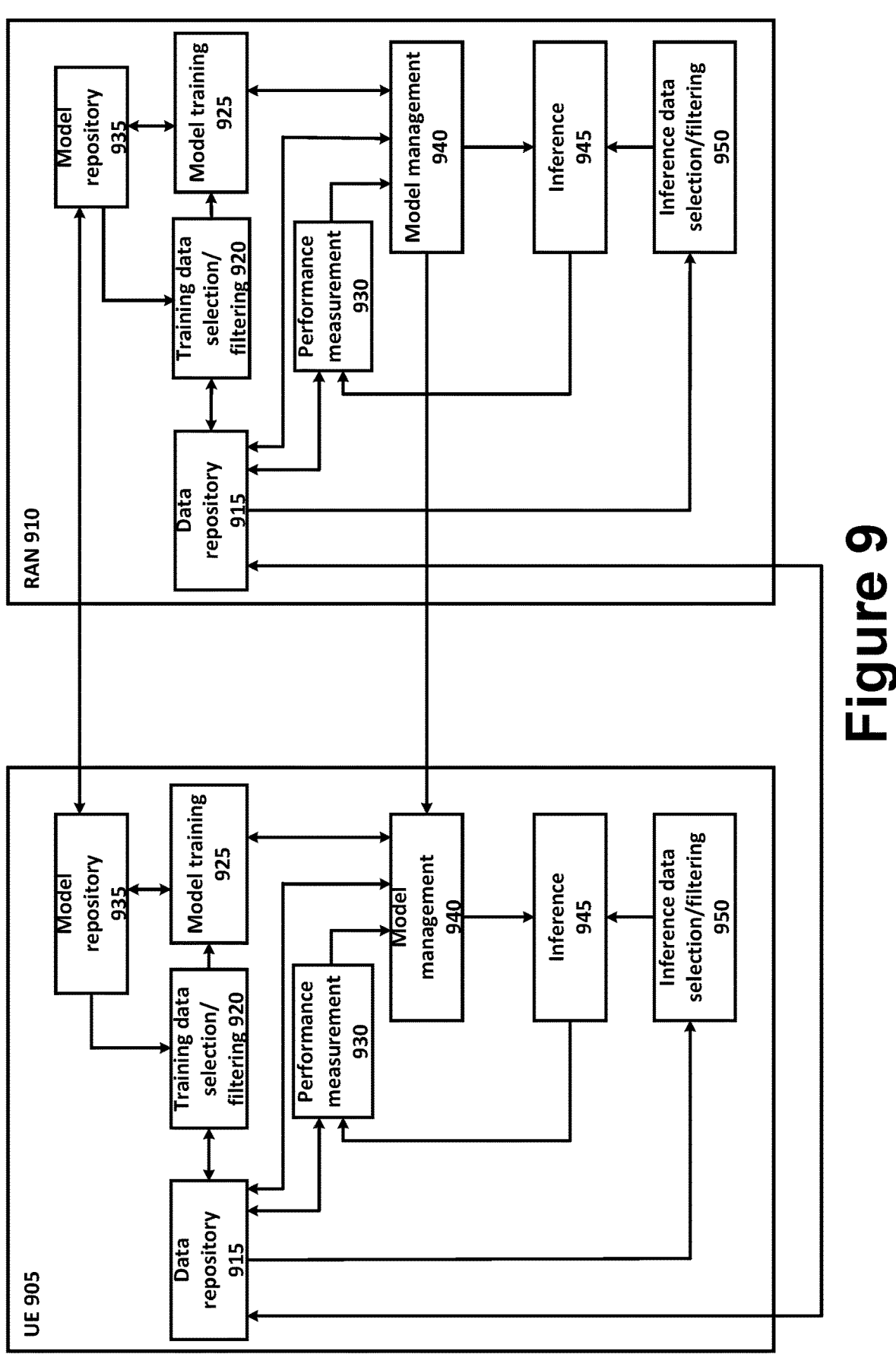
FIG. 9 illustrates a simplified block diagram of artificial (AI)-assisted communication between a UE and a RAN, in accordance with various embodiments.

FIG. 9 illustrates a simplified block diagram of artificial (AI)-assisted communication between a UE 905 and a RAN 910, in accordance with various embodiments. More specifically, as described in further detail below, AI/machine learning (ML) models may be used or leveraged to facilitate over-the-air communication between UE 905 and RAN 910.

One or both of the UE 905 and the RAN 910 may operate in a matter consistent with 3GPP technical specifications or technical reports for 6G systems. In some embodiments, the wireless cellular communication between the UE 905 and the RAN 910 may be part of, or operate concurrently with, networks 800, 500, and/or some other network described herein.

The UE 905 may be similar to, and share one or more features with, UE 802, UE 502, and/or some other UE described herein. The UE 905 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc. The RAN 910 may be similar to, and share one or more features with, RAN 514, RAN 808, and/or some other RAN described herein.

As may be seen in FIG. 9, the AI-related elements of UE 905 may be similar to the AI-related elements of RAN 910. For the sake of discussion herein, description of the various elements will be provided from the point of view of the UE 905, however it will be understood that such discussion or description will apply to equally named/numbered elements of RAN 910, unless explicitly stated otherwise.

As previously noted, the UE 905 may include various elements or functions that are related to AI/ML. Such elements may be implemented as hardware, software, firmware, and/or some combination thereof. In embodiments, one or more of the elements may be implemented as part of the same hardware (e.g., chip or multi-processor chip), software (e.g., a computing program), or firmware as another element.

One such element may be a data repository 915. The data repository 915 may be responsible for data collection and storage. Specifically, the data repository 915 may collect and store RAN configuration parameters, measurement data, performance key performance indicators (KPIs), model performance metrics, etc., for model training, update, and inference. More generally, collected data is stored into the repository. Stored data can be discovered and extracted by other elements from the data repository 915. For example, as may be seen, the inference data selection/filter element 950 may retrieve data from the data repository 915. In various embodiments, the UE 905 may be configured to discover and request data from the data repository 910 in the RAN, and vice versa. More generally, the data repository 915 of the UE 905 may be communicatively coupled with the data repository 915 of the RAN 910 such that the respective data repositories of the UE and the RAN may share collected data with one another.

Another such element may be a training data selection/filtering functional block 920. The training data selection/filter functional block 920 may be configured to generate training, validation, and testing datasets for model training. Training data may be extracted from the data repository 915. Data may be selected/filtered based on the specific AI/ML model to be trained. Data may optionally be transformed/augmented/pre-processed (e.g., normalized) before being loaded into datasets. The training data selection/filter functional block 920 may label data in datasets for supervised learning. The produced datasets may then be fed into model training the model training functional block 925.

As noted above, another such element may be the model training functional block 925. This functional block may be responsible for training and updating (re-training) AI/ML models. The selected model may be trained using the fed-in datasets (including training, validation, testing) from the training data selection/filtering functional block. The model training functional block 925 may produce trained and tested AI/ML models which are ready for deployment. The produced trained and tested models can be stored in a model repository 935.

The model repository 935 may be responsible for AI/ML models' (both trained and un-trained) storage and exposure. Trained/updated model(s) may be stored into the model repository 935. Model and model parameters may be discovered and requested by other functional blocks (e.g., the training data selection/filter functional block 920 and/or the model training functional block 925). In some embodiments, the UE 905 may discover and request AI/ML models from the model repository 935 of the RAN 910. Similarly, the RAN 910 may be able to discover and/or request AI/ML models from the model repository 935 of the UE 905. In some embodiments, the RAN 910 may configure models and/or model parameters in the model repository 935 of the UE 905.

Another such element may be a model management functional block 940. The model management functional block 940 may be responsible for management of the AI/ML model produced by the model training functional block 925. Such management functions may include deployment of a trained model, monitoring model performance, etc. In model deployment, the model management functional block 940 may allocate and schedule hardware and/or software resources for inference, based on received trained and tested models. As used herein, "inference" refers to the process of using trained AI/ML model(s) to generate data analytics, actions, policies, etc. based on input inference data. In performance monitoring, based on wireless performance KPIs and model performance metrics, the model management functional block 940 may decide to terminate the running model, start model re-training, select another model, etc. In embodiments, the model management functional block 940 of the RAN 910 may be able to configure model management policies in the UE 905 as shown.

Another such element may be an inference data selection/filtering functional block 950. The inference data selection/filter functional block 950 may be responsible for generating datasets for model inference at the inference functional block 945, as described below. Specifically, inference data may be extracted from the data repository 915. The inference data selection/filter functional block 950 may select and/or filter the data based on the deployed AI/ML model. Data may be transformed/augmented/pre-processed following the same transformation/augmentation/pre-processing as those in training data selection/filtering as described with respect to functional block 920. The produced inference dataset may be fed into the inference functional block 945.

Another such element may be the inference functional block 945. The inference functional block 945 may be responsible for executing inference as described above. Specifically, the inference functional block 945 may consume the inference dataset provided by the inference data selection/filtering functional block 950, and generate one or more outcomes. Such outcomes may be or include data analytics, actions, policies, etc. The outcome(s) may be provided to the performance measurement functional block 930.

The performance measurement functional block 930 may be configured to measure model performance metrics (e.g., accuracy, model bias, run-time latency, etc.) of deployed and executing models based on the inference outcome(s) for monitoring purpose. Model performance data may be stored in the data repository 915.

Example Procedures

In some embodiments, the electronic device(s), network(s), system(s), chip(s) or component(s), or portions or implementations thereof, of FIGS. 5-9, or some other figure herein, may be configured to perform one or more processes, techniques, or methods as described herein, or portions thereof. One such process is depicted in FIG. 10. The process of FIG. 10 may include or relate to a technique to be performed by one or more electronic devices that include and/or implement a network exposure function (NEF). The process may include identifying, at 1001 from an artificial intelligence application function (AI AF), a first AI AF session request related to authorization and reservation of resources for an AF session; selecting, at 1002 based on the AI AF session request, an artificial intelligence function (AIF); and transmitting, at 1003 to the selected AIF, a second AI AF session request.

Another such process is depicted in FIG. 11. The process of 11 may include or relate to a technique to be performed by one or more electronic devices that include and/or implement an artificial intelligence function (AIF). The process may include identifying, at 1101 from a network exposure function (NEF) of a cellular network, an artificial intelligence application function (AI AF) session request related to an application function (AF)s session, wherein the AI AF session request includes an identifier of a user equipment (UE); identifying, at 1102 based on the AI AF session request, whether the AI AF session is authorized for the UE; and if the AI AF session is authorized, transmitting, at 1103, a discovery request to a binding support function (BSF), wherein the discovery request is related to discovery of a policy control function (PCF) that is related to the UE.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1A may include the method where the ML provider Application Function sends the Nnef_GroupAFsessionWithQoS_Create request message with the AIML Group performance container, AIML Group information container.

Example 2A may include the method of example 1A or some other example herein, where the AIML Group performance container includes the service parameters for the AIML group, which is Maximum Requested bandwidth UL, Maximum Requested bandwidth DL, Maximum latency for the AIML group, Maximum packet loss rate in UL, Maximum packet loss rate in DL, Desired time for the requested QoS, Minimum number of UEs in the AIML group.

Example 3A may include the method of example 1A or some other example herein, where the AIML Group information container includes the external Group Identifier, Member UEs of the group, member UEs to be added to the group, member UEs to be removed from the group, Area of interest.

Example 4A may include the method of example 1A or some other example herein, where the NEF interacts with the PCF(s) by triggering a Npcf_GroupPolicyAuthorization_Create request and provides UE address(es), AF Identifier, Flow description(s), the QoS Reference, AIML Group performance container, AIML session indicator.

Example 5A may include the method of example 4A or some other example herein, where the UE address(es) includes all the UEs belonging to the AIML group served by the PCF.

Example 6A may include the method of examples 1A, 4A, 5A or some other example herein, where the NEF includes AIML session indicator if the Nnef_GroupAFsessionWithQoS_Create request includes the AIML Group Performance container.

Example 7A may include the method of examples 4A, 5A, 6A or some other example herein, where the PCF determines if the request from NEF is authorized and if not authorized the response from the PCF includes the list of UE(s) for which the policy authorization has failed.

Example 8A may include the method of examples 4A, 5A, 6A or some other example herein, where if the request from NEF is authorized, the PCF derives the required QoS parameters based on the information provided in the ALML group performance container.

Example 9A may include the method of example 8A or some other example herein, where the QoS flow binding will ensure that when the PCF provisions the PCC rule in the SMF containing the AIML group performance container, AIML session indicator, the PCC rule is bound to a new QoS Flow and no other PCC rule is bound to this QoS Flow.

Example 10A may include the method of examples 8A, 9A or some other example herein, where the PCC rule includes AIML Group performance container, AIML Session indicator.

Example 11A may include the method of example 10A or some other example herein, where the PCC rule generated by the PCF is applied to all UEs belonging to the AIML group served by the PCF.

Example 12A may include the method of examples 9A, 11A or some other example herein, where the PCF sends a Npcf_SMPolicyControl_UpdateNotify request to the SMF includes as input the SM Policy Association ID(s) of all the UEs served by the SMF which belong to the AIML Group.

Example 13A may include the method of example 1A or some other example herein, where a new 5G network function (AIML Group management function) is responsible for the AIML group AF session management function.

Example 14A may include the method of examples 1A, 13A or some other example herein, where the NEF forwards the request for group AF session to Group management function.

Example 15A may include the method of examples 13A, 14A or some other example herein, where the AIML Group management function is responsible for mapping the External group ID to the UE identifiers which are the member of the AIML group based on the information in the AIML Group Information container, discovering the PCFs serving the AIML group member UEs included in the AIML Group Information container, includes AIML session indicator in the policy authorization request or the group policy authorization request when the Group Management Function receives the Group AF session request from NEF includes the AIML Group Performance container.

Example 16A includes a method comprising: generating, by a machine learning (ML) application function (AF) a request message that includes one or more of a group performance container and a group information container; and transmitting, by the ML AF, the request message.

Example 17A includes the method of example 16A and/or some other example herein, wherein the request message is a Nnef_GroupAFsessionWithQoS_Create message.

Example 18A includes the method of any of examples 16A-17A and/or some other example herein, wherein the group performance container is an artificial intelligence/ML (AIML) group performance container.

Example 19A includes the method of any of examples 16A-18A and/or some other example herein, wherein the group information container is an AIML group information container.

Example 1B may include a method to implement a new service-based Artificial Intelligence network function (AIF) in a wireless cellular network (e.g., a 5G, 6G, or future generation network).

Example 2B may include the method of example 1B or some other example herein, where the AIF supports the AI group management for AF sessions from the AI Application Function which may be either a trusted AF or 3rd party Application Function supported via the NEF.

Example 3B may include the method of example 2B, or some other example herein, where AI group management responsibility of AIF includes one or more of: mapping the AF session request from AI Application Function for group, adding UEs to the group based on the request from AI Application Functions, removing UEs from the group based on the request from AI Application Functions, mapping the service requirement for AF session to the QoS requirement for a UE or group of UEs, and/or report events to the AI Application Function when UE(s) are no more able to fulfil the QoS requirement set by the AI Application Function.

Example 4B may include the method of example 2B or some other example herein, where the AIF Support AI service authorization for a UE or a group of UEs belonging to an AF group.

Example 5B may include the method of example 1B or some other example herein, where the NF consumer may utilize the NRF to discover AIF instance.

Example 6B may include the method of example 5B or some other example herein, where the factors for AIF selection may include S-NSSAI(s), DNN, External Group Identifier, Area of Interest, UE identifier/SUPI.

Example 7B may include the method of example 5B or some other example herein, where the PCF discovery and selection is supported by AIF or the AIF may utilize the NRF to discover the candidate PCF instance serving the UEs belonging to an AF group.

Example 8B may include the method of example 1B or some other example herein, where the AI application function sends an AI AF session request over the N33 interface to get authorization and reserve resources for AF session with AIML Group container information element.

Example 9B may include the method of example 8B, 5B, or some other example herein, where the NEF selects the AIF and sends Naif_AFSession Create request message which includes UE address, AF Identifier, Flow Description, DNN, S-NSSAI, AIML Group Container.

Example 10B may include the method of example 9B or some other example herein, where the AIF assigns a Transaction ID for the AI session and determines if the UE address included in the request is authorized for application layer AI operations. The AIF sends Nudm_AIServiceAuthorisation-_Create request including the S-NSSAI, DNN and AI service type (Application Identifier) to the UDM. The UDM responds with the AI service authorization result. If the authorization for fails for example the UE is not authorized for AI specific operations from AI AF (identifier/port ID) the UDM returns an appropriate error code, and the AIF rejects the Naif_AFSession Create request with a proper error code to inform the NEF about the request not authorized.

Example 11B may include the method of example 9B, 10B, or some other example herein, where if the service authorization is successful, the AIF sends a Nbsf_Management_Discovery request to BSF to discover the PCF(s) serving the UEs. The AIF interacts with the PCF by triggering a Npcf_PolicyAuthorization_Update request and provides UE address, AF Identifier, the QoS requested in AIML Group Container for the AI AF session. If the request is authorized, the PCF generates a PCC rule or modifies the existing PCC rule based on the QoS information and other service information in the AIML Group container provided by the AIF.

Example 12B may include the method of example 11B or some other example herein, where if the policy needs to be updated at the SMF serving the UEs, the QoS flow binding shall ensure that, when the PCF provisions the PCC rule in SMF which contains the AIML session indicator, the PCC rule is bound to a new QoS Flow and no other PCC rule is bound to this QoS Flow.

Example 13B may include the method of example 1B, 10B, or some other example herein, where the UE subscription data includes AI subscription data, which indicates whether the UE is allowed join an AI group to participate in AI operations performed between the UE and AI AF.

Example 14B may include the method of example 1B, 10B, or some other example herein, where the UDR Application data includes AI service specific information with data keys S-NSSAI, DNN, AI AF identifier.

Example 15B may include the method of example 1B, 11B, or some other example herein, where the PCC rule includes AIML session indicator which is applicable only for AI AF sessions.

Example 16B may include the method of example 1B, 8B, 9B, or some other example herein, where AIF service operation includes Naif_AFSession Create supporting request and response messages.

Example 17B may include a method comprising: interfacing with one or more artificial intelligence (AI) application functions of a wireless cellular network; and implementing an AI network function (AIF) to manage an AI group for AF sessions associated with the one or more AI application functions.

Example 18B may include the method of example 17B or some other example herein, wherein the one or more AI application functions include one or more trusted application functions and/or one or more third party application functions supported via a network exposure function (NEF).

Example 19B may include the method of example 17B-18B, or some other example herein, wherein managing the AI group includes one or more of: mapping an application function session request from AI Application Function for the AI group; adding one or more UEs to the AI group based on a request from one of the AI application functions; removing one or more UEs from the AI group based on a request from one of the AI application functions; mapping one or more service requirements for the AF session to a QoS requirement for one or more UEs of the AI group; and/or reporting events to one or more of the AI application functions when one or more UEs of the AI group are no longer able to fulfil a QoS requirement set by the respective AI application function.

Example 1C relates to a method to be performed by one or more electronic devices that include or implement a network exposure function (NEF) of a cellular network, wherein the method comprises identifying, from an artificial intelligence application function (AI AF), a first AI AF session request related to authorization and reservation of resources for an AF session; selecting, based on the AI AF session request, an artificial intelligence function (AIF); and transmitting, to the selected AIF, a second AI AF session request.

Example 2C includes the method of example 1C, and/or some other example herein, wherein the first AI AF session request is a Nnef_AFsessionauthorizationWithQoS_Create request message.

Example 3C includes the method of example 2C, and/or some other example herein, wherein the first AI AF session request includes an indication of a user equipment (UE) address, an indication of an application function (AF) identifier, an indication of a flow description, an indication of a domain network name (DNN), and an indication of a single-network slice selection assistance information (S-NSSAI).

Example 4C includes the method of examples 2C, and/or some other example herein, wherein the first AI AF session request includes an indication of an artificial intelligence/machine learning (AI/MIL) group container.

Example 5C includes the method of any of examples 1C-4C, and/or some other example herein, wherein the second AI AF session request is a Naif_AFSession Create request message.

Example 6C includes the method of example 5C, and/or some other example herein, wherein the second AI AF session request includes an indication of an artificial intelligence/machine learning (AI/MIL) group container.

Example 7C includes an example to be performed by one or more electronic devices that include or implement an artificial intelligence function (AIF), wherein the method comprises: identifying, from a network exposure function (NEF) of a cellular network, an artificial intelligence application function (AI AF) session request related to an application function (AF) session, wherein the AI AF session request includes an identifier of a user equipment (UE); identifying, based on the AI AF session request, whether the AI AF session is authorized for the UE; and if the AI AF session is authorized, transmitting a discovery request to a binding support function (BSF), wherein the discovery request is related to discovery of a policy control function (PCF) that is related to the UE.

Example 8C includes the method of example 7C, and/or some other example herein, wherein the AI AF session request further includes an indication of an application function (AF) identifier, an indication of a flow description, an indication of a domain network name (DNN), and an indication of a single-network slice selection assistance information (S-NSSAI).

Example 9C includes the method of any of examples 7C-8C, and/or some other example herein, wherein the AI AF session request further includes an indication of an artificial intelligence/machine learning (AI/ML) group container.

Example 10C includes the method of any of examples 7C-9C, and/or some other example herein, wherein the AI AF session request is a Naif_AFSession Create request message.

Example 11C includes the method of any of examples 7C-10C, and/or some other example herein, wherein the discovery request is a Nbsf_Management_Discovery request.

Example 12C includes the method of any of examples 7C-11C, and/or some other example herein, wherein the instructions are further to identify, based on the discovery request, a discovery response that includes an indication of the PCF.

Example 13C includes the method of example 12C, and/or some other example herein, wherein the discovery response is a Nbsf_Management_Discovery response.

Example Z01 may include an apparatus comprising means to perform one or more elements of a method described in or related to any of examples 1A-13C, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1A-13C, or any other method or process described herein.

Example Z03 may include an apparatus comprising logic, modules, or circuitry to perform one or more elements of a method described in or related to any of examples 1A-13C, or any other method or process described herein.

Example Z04 may include a method, technique, or process as described in or related to any of examples 1A-13C, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1A-13C, or portions thereof.

Example Z06 may include a signal as described in or related to any of examples 1A-13C, or portions or parts thereof.

Example Z07 may include a datagram, packet, frame, segment, protocol data unit (PDU), or message as described in or related to any of examples 1A-13C, or portions or parts thereof, or otherwise described in the present disclosure.

Example Z08 may include a signal encoded with data as described in or related to any of examples 1A-13C, or portions or parts thereof, or otherwise described in the present disclosure.

Example Z09 may include a signal encoded with a datagram, packet, frame, segment, protocol data unit (PDU), or message as described in or related to any of examples 1A-13C, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1A-13C, or portions thereof.

Example Z11 may include a computer program comprising instructions, wherein execution of the program by a processing element is to cause the processing element to carry out the method, techniques, or process as described in or related to any of examples 1A-13C, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-

06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |

US 12,677,328 B2

| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |

| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Special Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| HOT | Industrial Internet of Things |
| IM | Interference Measurement, Intermodulation, IP Multimedia |
| IMC | IMS Credentials |
| IMEI | International Mobile Equipment Identity |

| | |
|---|---|
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |

| | |
|---|---|
| MGL | Measurement Gap Length |
| MGRP | Measurement Gap Repetition Period |
| MIB | Master Information Block, Management Information Base |
| MEMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | Multiprotocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications mMTCmassive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |

-continued

| | |
|---|---|
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |

-continued

| | |
|---|---|
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |

| | |
|---|---|
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink UM Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |

| | |
|---|---|
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/ or functional processes. Processing circuitry may include more hardware accelerators, which may be microprocessors, programmable processing devices, or the like. The one or more hardware accelerators may include, for example, computer vision (CV) and/or deep learning (DL) accelerators.

The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An electronic device that comprises:

one or more processors; and one or more non-transitory computer-readable media (NTCRM) comprising instructions that, upon execution of the instructions by the one or more processors, are to cause a network exposure function (NEF) of a cellular network to:

identify, from an artificial intelligence application function (AI AF), a first AI AF session request related to authorization and reservation of resources for an AF session;

select, based on the AI AF session request, an artificial intelligence function (AIF); and transmit, to the selected AIF, a second AI AF session request, wherein the second AI AF session request is to include an AIML session indicator based on a determination that the first AI AF session request includes an AIML group performance container.

2. The electronic device of claim 1, wherein the first AI AF session request is a Nnef_AFsessionauthorizationWithQoS_Create request message.

3. The electronic device of claim 2, wherein the first AI AF session request includes an indication of a user equipment (UE) address, an indication of an application function (AF) identifier, an indication of a flow description, an indication of a domain network name (DNN), and an indication of a single-network slice selection assistance information (S-NSSAI).

4. The electronic device of claim 2, wherein the first AI AF session request includes an indication of an artificial intelligence/machine learning (AI/ML) group container.

5. The electronic device of claim 1, wherein the second AI AF session request is a Naif_AFSession Create request message.

6. The electronic device of claim 5, wherein the second AI AF session request includes an indication of an artificial intelligence/machine learning (AI/ML) group container.

7. An electronic device that comprises:

one or more processors; and one or more non-transitory computer-readable media (NTCRM) comprising instructions that, upon execution of the instructions by the one or more processors, are to cause an artificial intelligence function (AIF) to:

identify, from a network exposure function (NEF) of a cellular network, an artificial intelligence application function (AI AF) session request related to an application function (AF) session, wherein the AI AF session request includes an identifier of a user equipment (UE) and an AIML session indicator based on a determination that an initial AF session request included an AIML group performance container;

identify, based on the AI AF session request, whether the AI AF session is authorized for the UE; and if the AI AF session is authorized, transmit a discovery request to a binding support function (BSF), wherein the discovery request is related to discovery of a policy control function (PCF) that is related to the UE.

8. The electronic device of claim 7, wherein the AI AF session request further includes an indication of an application function (AF) identifier, an indication of a flow description, an indication of a domain network name (DNN), and an indication of a single-network slice selection assistance information (S-NSSAI).

9. The electronic device of claim 7, wherein the AI AF session request further includes an indication of an artificial intelligence/machine learning (AI/ML) group container.

10. The electronic device of claim 7, wherein the AI AF session request is a Naif_AFSession Create request message.

11. The electronic device of claim 7, wherein the discovery request is a Nbsf_Management_Discovery request.

12. The electronic device of claim 7, wherein the instructions are further to identify, based on the discovery request, a discovery response that includes an indication of the PCF.

13. The electronic device of claim 12, wherein the discovery response is a Nbsf_Management_Discovery response.

14. One or more non-transitory computer-readable media (NTCRM) comprising instructions that, upon execution of the instructions by one or more processors, are to cause an artificial intelligence function (AIF) to:

identify, from a network exposure function (NEF) of a cellular network, an artificial intelligence application function (AI AF) session request related to an application function (AF) session, wherein the AI AF session request includes an identifier of a user equipment (UE) and an AIML session indicator based on a determination that an initial AF session request included an AIML group performance container;

identify, based on the AI AF session request, whether the AI AF session is authorized for the UE; and if the AI AF session is authorized, transmit a discovery request to a binding support function (BSF), wherein the discovery request is related to discovery of a policy control function (PCF) that is related to the UE.

15. The electronic device of claim 14, wherein the AI AF session request further includes an indication of an application function (AF) identifier, an indication of a flow description, an indication of a domain network name (DNN), and an indication of a single-network slice selection assistance information (S-NSSAI).

16. The electronic device of claim 14, wherein the AI AF session request further includes an indication of an artificial intelligence/machine learning (AI/ML) group container.

17. The electronic device of claim 14, wherein the AI AF session request is a Naif_AFSession Create request message.

18. The electronic device of claim 14, wherein the discovery request is a Nbsf_Management_Discovery request.

19. The electronic device of claim 14, wherein the instructions are further to identify, based on the discovery request, a discovery response that includes an indication of the PCF.

20. The electronic device of claim 19, wherein the discovery response is a Nbsf_Management_Discovery response.

* * * * *